(12) United States Patent
Bretz et al.

(10) Patent No.: US 11,048,048 B2
(45) Date of Patent: Jun. 29, 2021

(54) HARDENED OPTICAL POWER CONNECTION SYSTEM

(71) Applicant: CommScope Technologies LLC, Hickory, NC (US)

(72) Inventors: Dwight A. Bretz, Hummelstown, PA (US); Robert Charles Flaig, Lancaster, PA (US); Thomas P. Huegerich, Fuquay Varina, NC (US); Michael Lawrence Gurreri, York, PA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/773,548

(22) Filed: Jan. 27, 2020

(65) Prior Publication Data

US 2020/0264382 A1     Aug. 20, 2020

Related U.S. Application Data

(63) Continuation of application No. 15/886,266, filed on Feb. 1, 2018, now Pat. No. 10,585,246, which is a continuation of application No. 15/115,931, filed as application No. PCT/US2015/014977 on Feb. 9, 2015, now Pat. No. 9,927,580.

(60) Provisional application No. 61/937,291, filed on Feb. 7, 2014.

(51) Int. Cl.
  *G02B 6/44*     (2006.01)
  *G02B 6/38*     (2006.01)

(52) U.S. Cl.
  CPC ......... *G02B 6/3817* (2013.01); *G02B 6/4416* (2013.01); *G02B 6/4479* (2013.01); *G02B 6/4495* (2013.01); *G02B 6/3869* (2013.01)

(58) Field of Classification Search
  None
  See application file for complete search history.

(56) References Cited

U.S. PATENT DOCUMENTS

| 3,617,614 | A | 11/1971 | Henry |
| 4,467,138 | A | 8/1984 | Brorein |
| 4,801,191 | A | 1/1989 | Nakai et al. |
| 4,844,582 | A | 7/1989 | Giannini |
| 4,896,939 | A | 1/1990 | O'Brien |

(Continued)

FOREIGN PATENT DOCUMENTS

| CN | 101305307 A | 11/2008 |
| CN | 202 141 834 U | 2/2012 |

(Continued)

OTHER PUBLICATIONS

Extended European Search Report issued in related European Patent Application No. 15746963.6 dated Aug. 11, 2017, 11 pages.

(Continued)

*Primary Examiner* — Rhonda S Peace
(74) *Attorney, Agent, or Firm* — Merchant & Gould P.C.

(57) ABSTRACT

The present disclosure relates to a hardened power and optical connection system for use with hybrid cables. The hardened power and optical connection system includes electrical pin and socket contacts for providing power connections, and ferrules for providing optical connections. The hardened power and optical connection system has an integrated fiber alignment provided through a mating relationship between a plug and a socket.

28 Claims, 25 Drawing Sheets

(56) References Cited

U.S. PATENT DOCUMENTS

| | | | |
|---|---|---|---|
| 4,953,929 A | 9/1990 | Basista et al. |
| 5,015,061 A | 5/1991 | Giannini |
| 5,123,071 A | 6/1992 | Mulholland et al. |
| 5,226,832 A | 7/1993 | Dejardin et al. |
| 5,253,316 A | 10/1993 | Shibutani et al. |
| 5,348,349 A | 9/1994 | Sloane |
| 5,432,879 A | 7/1995 | Lee |
| 5,469,523 A | 11/1995 | Blew |
| 5,574,812 A | 11/1996 | Beier et al. |
| 5,757,996 A | 5/1998 | Vine |
| 5,778,121 A | 7/1998 | Hyzin |
| 5,882,044 A | 3/1999 | Sloane |
| 6,293,595 B1 | 9/2001 | Marc et al. |
| 6,508,593 B1 | 1/2003 | Farnsworth et al. |
| 6,518,506 B2 * | 2/2003 | Zink ............... G02B 6/3817 174/138 G |
| 6,719,461 B2 | 4/2004 | Cull |
| 6,789,952 B2 | 9/2004 | Lancelle |
| 6,874,946 B2 | 4/2005 | Cull |
| 6,962,445 B2 | 11/2005 | Zimmel |
| 7,189,006 B2 | 3/2007 | Dent |
| 7,213,975 B2 | 5/2007 | Khemakhem et al. |
| 7,234,877 B2 | 6/2007 | Sedor |
| 7,326,073 B2 | 2/2008 | Hanning et al. |
| 7,338,214 B1 | 3/2008 | Gurreri et al. |
| 7,367,832 B2 | 5/2008 | Muhs et al. |
| 7,481,584 B2 | 1/2009 | Cairns |
| 7,572,063 B2 | 8/2009 | Mynott |
| 7,645,162 B2 | 1/2010 | Kadar-Kallen et al. |
| 7,758,389 B2 | 7/2010 | Kadar-Kallen et al. |
| 7,794,155 B1 | 9/2010 | Haley et al. |
| 7,942,588 B2 | 5/2011 | Durand |
| 7,972,067 B2 | 7/2011 | Haley et al. |
| 8,113,722 B2 | 2/2012 | Scadden et al. |
| 8,249,410 B2 | 8/2012 | Andrus et al. |
| 8,475,055 B2 | 7/2013 | Ciechomski |
| 8,480,312 B2 | 7/2013 | Smith et al. |
| 8,556,520 B2 * | 10/2013 | Elenbaas ............ G02B 6/387 385/55 |
| 8,579,644 B2 | 11/2013 | Cole et al. |
| 8,628,252 B2 | 1/2014 | Matsumoto et al. |
| 8,757,915 B2 | 6/2014 | Sugimoto et al. |
| 8,814,441 B2 | 8/2014 | Strasser et al. |
| 8,992,148 B2 | 3/2015 | Schafer et al. |
| 9,235,021 B2 * | 1/2016 | Islam ................. H02G 3/02 |
| 9,472,314 B2 | 10/2016 | Kachmar |
| 9,477,049 B2 | 10/2016 | Gniadek et al. |
| 9,500,812 B2 | 11/2016 | Tanaka |
| 9,535,230 B2 | 1/2017 | Newbury et al. |
| 9,658,407 B2 | 5/2017 | Volker et al. |
| 9,684,135 B2 | 6/2017 | Mori et al. |
| 9,755,382 B2 | 9/2017 | Gniadek |
| 9,784,922 B2 | 10/2017 | Govari |
| 9,927,580 B2 | 3/2018 | Bretz et al. |
| 10,061,090 B2 | 8/2018 | Coenegracht |
| 10,151,889 B2 * | 12/2018 | Tsukamoto ........ G02B 6/3885 |
| 10,396,512 B2 | 8/2019 | Gniadek |
| 10,649,152 B1 * | 5/2020 | Yang ................ G02B 6/3817 |
| 2003/0016916 A1 | 1/2003 | Allen |
| 2003/0156798 A1 | 8/2003 | Cull |
| 2003/0235379 A1 | 12/2003 | Lin |
| 2004/0062498 A1 | 4/2004 | Del Grosso et al. |
| 2004/0116000 A1 | 6/2004 | Sandoval et al. |
| 2004/0161203 A1 | 8/2004 | Cull |
| 2004/0218873 A1 | 11/2004 | Nagashima et al. |
| 2006/0093277 A1 | 5/2006 | Mulligan |
| 2006/0153503 A1 | 7/2006 | Suzuki et al. |
| 2006/0246771 A1 | 11/2006 | Pepe et al. |
| 2006/0263011 A1 | 11/2006 | Chen et al. |
| 2007/0014522 A1 | 1/2007 | Yamaguchi et al. |
| 2007/0058907 A1 | 3/2007 | Mynott |
| 2007/0105432 A1 | 5/2007 | Muhs et al. |
| 2007/0249218 A1 | 10/2007 | Hanning et al. |
| 2008/0050070 A1 | 2/2008 | Gurreri et al. |
| 2008/0070446 A1 | 3/2008 | Lauermann et al. |
| 2009/0269013 A1 | 10/2009 | Durand et al. |
| 2009/0269019 A1 | 10/2009 | Andrus et al. |
| 2010/0215322 A1 | 8/2010 | Matsumoto et al. |
| 2011/0274437 A1 | 11/2011 | Jones et al. |
| 2012/0039571 A1 | 2/2012 | Ciechomski et al. |
| 2012/0114288 A1 * | 5/2012 | Wu ................ G02B 6/3817 385/78 |
| 2012/0148196 A1 * | 6/2012 | Penumatcha ........ G02B 6/3817 385/53 |
| 2013/0301994 A1 | 11/2013 | Motofuji |
| 2014/0140671 A1 | 5/2014 | Islam |
| 2016/0018602 A1 | 1/2016 | Govari |
| 2016/0266326 A1 | 9/2016 | Gniadek |
| 2017/0176690 A1 | 6/2017 | Bretz et al. |
| 2017/0365962 A1 | 12/2017 | Gniadek |
| 2018/0011276 A1 * | 1/2018 | Marchek ............. G02B 6/4472 |
| 2018/0031775 A1 | 2/2018 | Gurreri et al. |

FOREIGN PATENT DOCUMENTS

| | | |
|---|---|---|
| CN | 102819071 A | 12/2012 |
| EP | 1 006 379 A2 | 6/2000 |
| EP | 2 302 431 A1 | 3/2011 |
| EP | 2 354 825 A1 | 8/2011 |
| WO | 2014/003063 A1 | 1/2014 |

OTHER PUBLICATIONS

International Search Report and Written Opinion issued in related International Patent Application No. PCT/US2015/014977 dated May 22, 2015 (12 pages).

* cited by examiner

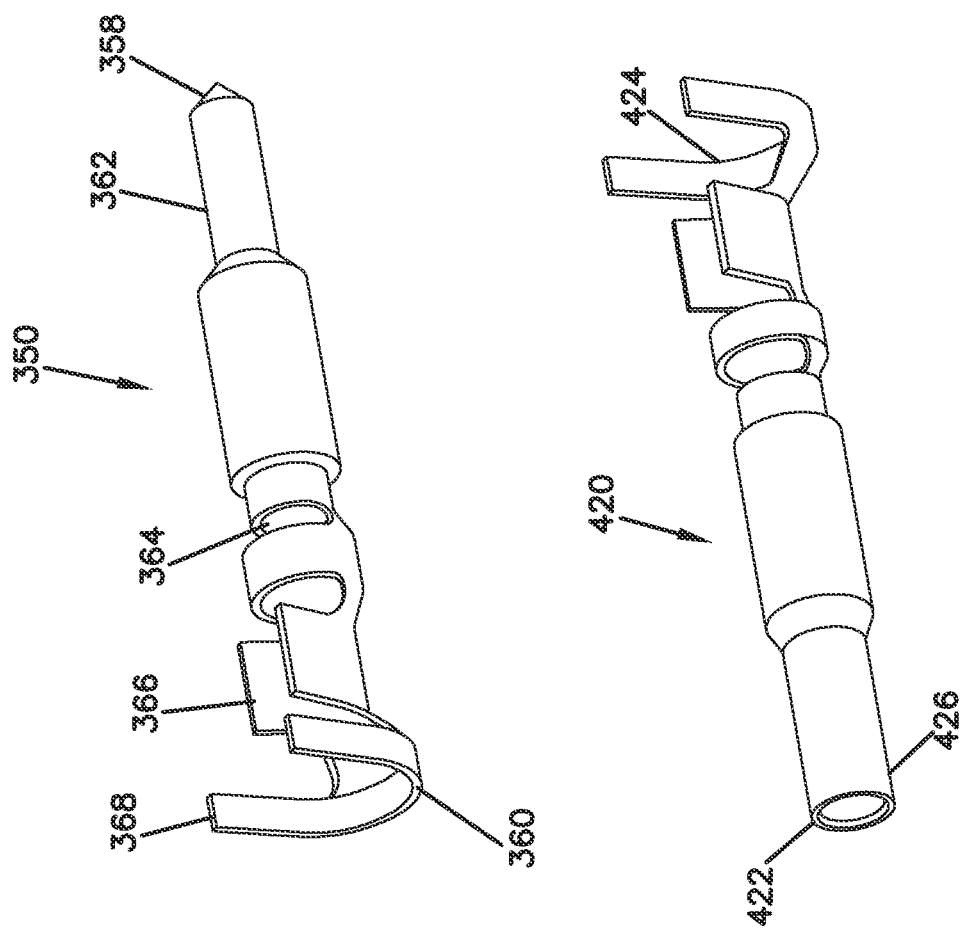

US 11,048,048 B2

HARDENED OPTICAL POWER CONNECTION SYSTEM

CROSS-REFERENCE TO RELATED APPLICATIONS

This application is a Continuation of U.S. patent application Ser. No. 15/886,266, filed on Feb. 1, 2018, now U.S. Pat. No. 10,585,246, which is a Continuation of U.S. patent application Ser. No. 15/115,931 filed on Aug. 2, 2016, now U.S. Pat. No. 9,927,580, which is a National Stage of PCT/US2015/014977, filed on Feb. 9, 2015, which claims benefit of U.S. Patent Application Ser. No. 61/937,291 filed on Feb. 7, 2014, and which applications are incorporated herein by reference. To the extent appropriate, a claim of priority is made to each of the above disclosed applications.

BACKGROUND

The present disclosure relates generally to hybrid optical fiber and electrical communication systems.

Rapid growth of portable high-speed wireless transceiver devices (e.g., smart phones, tablets, laptop computers, etc.) continues in today's market, thereby creating higher demand for untethered contact. Thus, there is growing demand for integrated voice, data and video capable of being transmitted wirelessly at data rates of 10 Gbits/second and faster. To provide the bandwidth needed to support this demand will require the cost effective and efficient deployment of additional fixed location transceivers (i.e., cell sites or nodes) for generating both large and small wireless coverage areas.

Fiber optic technology is becoming more prevalent as service providers strive to deliver higher bandwidth communication capabilities to customers/subscribers. The phrase "fiber to the x" (FTTX) generically refers to any network architecture that uses optical fiber in place of copper within a local distribution area. Example FTTX networks include fiber-to-the-node (FTTN) networks, fiber-to-the-curb (FTTC) networks, fiber-to-the-home (FTTH), and more generally, fiber-to-the-wireless (FTTW).

The high signal speeds associated with fiber optic technology have driven the demand to use fiber optic technology to support wireless networks. However, wireless networks typically require power for driving components such as transceivers. This can present problems in fiber optic networks, which are often passive. In this regard, there is a need for improved hybrid systems that can efficiently distribute fiber optic signals and power to components of a wireless network.

SUMMARY

Aspects of the present disclosure relate to connectors and connector systems capable of providing optical and power connections in a telecommunications network such as a fiber optic network. In certain examples, the connectors and connector systems can be hardened (e.g., sealed and ruggedized) for use in outdoor environmental applications. In certain examples, the connectors and connector systems can be used to provide efficient power and fiber connections in a mobile network topology. In certain examples, the connectors and connector systems can be used with cables having central sections containing optical fibers and strippable outer sections including electrical power conductors.

BRIEF DESCRIPTION OF THE DRAWINGS

FIG. 25 is a perspective view of an electrical pin contact that can be used in connectors in accordance with the principles of the present disclosure.

FIG. 26 is a perspective view of an electrical socket contact that can be used in connectors in accordance with the principles of the present disclosure.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as top, bottom, front, back, etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense.

Figure 1:
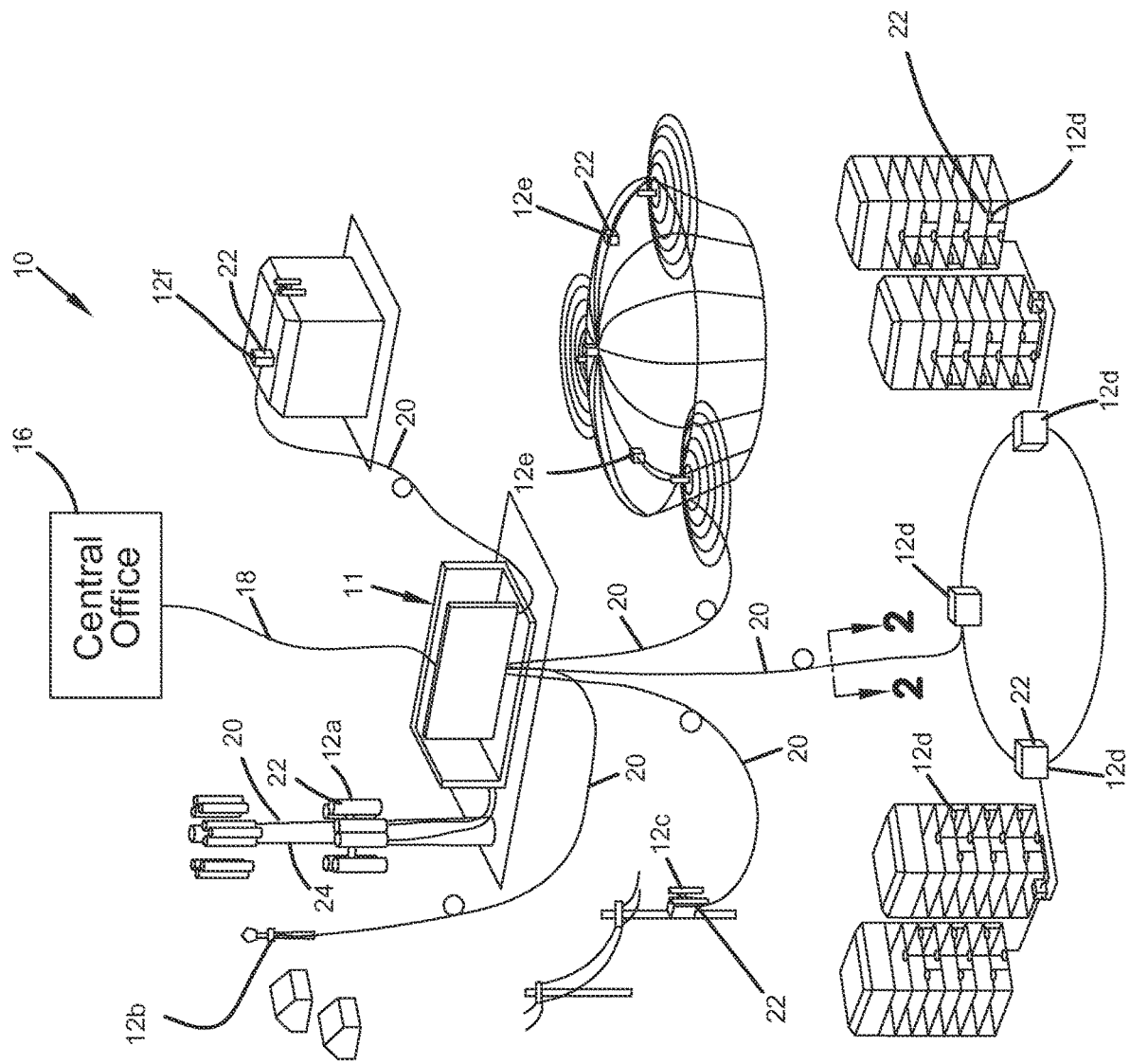
FIG. 1 is a system diagram showing an example distribution of wireless coverage areas deployed using a power and optical fiber interface system in accordance with principles of the present disclosure.

FIG. 1 shows a system 10 in accordance with the principles of the present disclosure for enhancing the coverage areas provided by cellular technologies (e.g., GSM, CDMA, UMTS, LTE, WiMax, WiFi, etc.). The system 10 includes a base location 11 (i.e., a hub) and a plurality of wireless coverage area defining equipment 12a, 12b, 12c, 12d, 12e and 12f (sometimes collectively referred to as equipment 12 herein) distributed about the base location 11. In certain examples, the base location 11 can include a structure 14 (e.g., a closet, hut, building, housing, enclosure, cabinet, etc.) protecting telecommunications equipment such as racks, fiber optic adapter panels, passive optical splitters, wavelength division multiplexers, fiber splice locations, optical fiber patching and/or fiber interconnect structures and other active and/or passive equipment. In the depicted example, the base location 11 is connected to a central office 16 or other remote location by a fiber optic cable such as a multi-fiber optical trunk cable 18 that provides high bandwidth two-way optical communication between the base location 11 and the central office 16 or other remote location. In the depicted example, the base location 11 is connected to the wireless coverage area defining equipment 12a, 12b, 12c, 12d, 12e and 12f by hybrid cables 20. The hybrid cables 20 are each capable of transmitting both power and communications between the base location 11 and the wireless coverage area defining equipment 12a, 12b, 12c, 12d, 12e and 12f.

The wireless coverage area defining equipment 12a, 12b, 12c, 12d, 12e and 12f can each include one or more wireless transceivers 22. The transceivers 22 can include single transceivers 22 or distributed arrays of transceivers 22. As used herein, a "wireless transceiver" is a device or arrangement of devices capable of transmitting and receiving wireless signals. A wireless transceiver typically includes an antenna for enhancing receiving and transmitting the wireless signals. Wireless coverage areas are defined around each of the wireless coverage area defining equipment 12a, 12b, 12c, 12d, 12e and 12f. Wireless coverage areas can also be referred to as cells, cellular coverage areas, wireless coverage zones, or like terms. Examples of and/or alternative terms for wireless transceivers include radio-heads, wireless routers, cell sites, wireless nodes, etc.

In the depicted example of FIG. 1, the base location 11 is shown as a base transceiver station (BTS) located adjacent to a radio tower 24 supporting and elevating a plurality the wireless coverage area defining equipment 12a. In one example, the equipment 12a can define wireless coverage areas such as a macrocells or microcells (i.e., cells each having a coverage area less than or equal to about 2 kilometers wide). The wireless coverage area defining equipment 12b is shown deployed at a suburban environment (e.g., on a light pole in a residential neighborhood) and the equipment 12c is shown deployed at a roadside area (e.g., on a roadside power pole). The equipment 12c could also be installed at other locations such as tunnels, canyons, coastal areas, etc. In one example, the equipment 12b, 12c can define wireless coverage areas such as microcells or picocells (i.e., cells each having a coverage area equal to or less than about 200 meters wide). The equipment 12d is shown deployed at a campus location (e.g., a university or corporate campus), the equipment 12e is shown deployed at a large public venue location (e.g., a stadium), and the equipment 12f is shown installed at an in-building or near-building environment (e.g., multi-dwelling unit, high rise, school, etc.). In one example, the equipment 12d, 12e, and 12f can define wireless coverage areas such as microcells, picocells, or femtocells (i.e., cells each having a coverage area equal to or less than about 10 meters wide).

Figure 2:
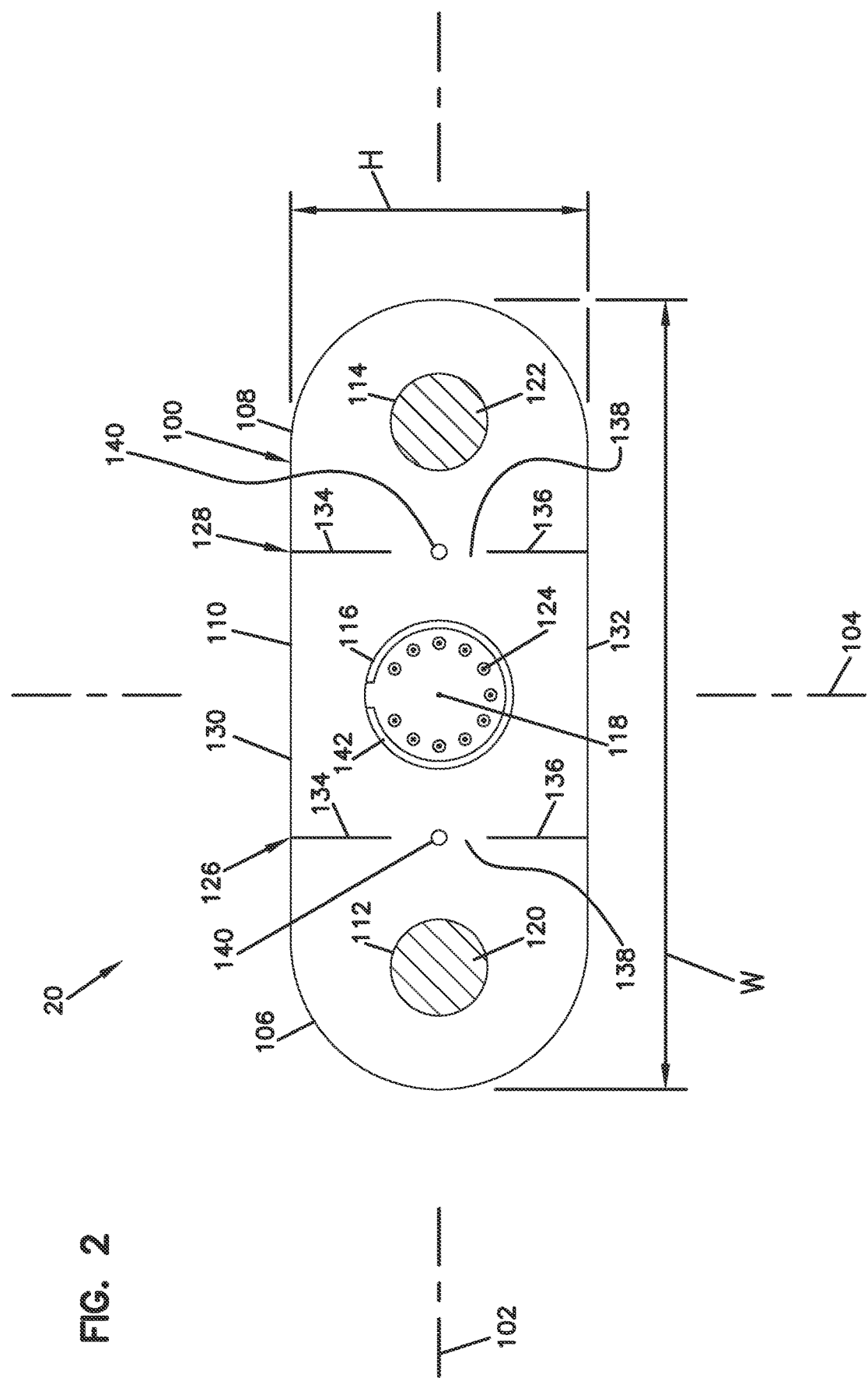
FIG. 2 is a transverse cross-sectional view of a power/optical fiber hybrid cable in accordance with principles of the present disclosure.

The wireless coverage area defining equipment 12 are often located in areas without power outlets conveniently located. As noted above, the hybrid cable 20 provides both power and data to the equipment 12. FIG. 2 is a transverse cross-sectional view taken through an example of one of the hybrid cables 20 of FIG. 1. Hybrid cable 20 includes an outer jacket 200 having a transverse cross-sectional profile that defines a major axis 202 and a minor axis 204. The outer jacket has a height H measured along the minor axis 204 and a width W measured along the major axis 202. The width W is greater than the height H such that the transverse cross-sectional profile of the outer jacket 200 is elongated along the major axis 202.

The outer jacket 200 can include a left portion 206, a right portion 208 and a central portion 210. The left portion 206, the right portion 208 and the central portion 210 can be positioned along the major axis 202 with the central portion 210 being disposed between the left portion 206 and the right portion 208. The left portion 206 can define a left passage 212, the right portion 208 can define a right passage 214 and the central portion 210 can define a central passage 216. The passages 212, 214 and 216 can have lengths that extend along a central longitudinal axis 218 of the cable 20 for the length of the cable. A left electrical conductor 220 is shown positioned within the left passage 212, a right electrical conductor 222 is shown positioned within the right passage 214 and at least one optical fiber 224 is shown positioned within the central passage 216. Certain embodiments include from 1 to 12 fibers 224, for example. The left electrical conductor 220, the right electrical conductor 222 and the optical fiber 224 have lengths that extend along the central longitudinal axis 218 of the cable 20.

Still referring to FIG. 2, the hybrid cable 20 includes a left pre-defined tear location 226 positioned between the central portion 210 and the left portion 206 of the outer jacket 200, and a right pre-defined tear location 228 positioned between the central portion 210 and the right portion 208 of the outer jacket 200. The left pre-defined tear location 226 is weakened such that the left portion 206 of the outer jacket 200 can be manually torn from the central portion 210 of the outer jacket 200. Similarly, the right pre-defined tear location 228 is weakened such that the right portion 208 of the outer jacket 200 can be manually torn from the central portion 210 of the outer jacket 200. The left pre-defined tear location 226 is configured such that the left portion 206 of the outer jacket 200 fully surrounds the left passage 212 and the central portion 210 of the outer jacket 200 fully surrounds the central passage 216 after the left portion 206 of the outer jacket 200 has been torn from the central portion 210 of the outer jacket 200. In this way, the left electrical conductor 220 remains fully insulated and the optical fiber 220 remains fully protected after the left portion 206 has been torn from the central portion 210. The right pre-defined tear location 228 is configured such that the right portion 208 of the outer jacket 200 fully surrounds the right passage 214 and the central portion 210 of the outer jacket 200 fully surrounds the central passage 219 after the right portion 208 of the outer jacket 200 has been torn from the central portion 210 of the outer jacket 200. In this way, the right electrical conductor 222 remains fully insulated and the optical fiber 224 remains fully protected after the right portion 208 has been torn from the central portion 210.

Figure 3:
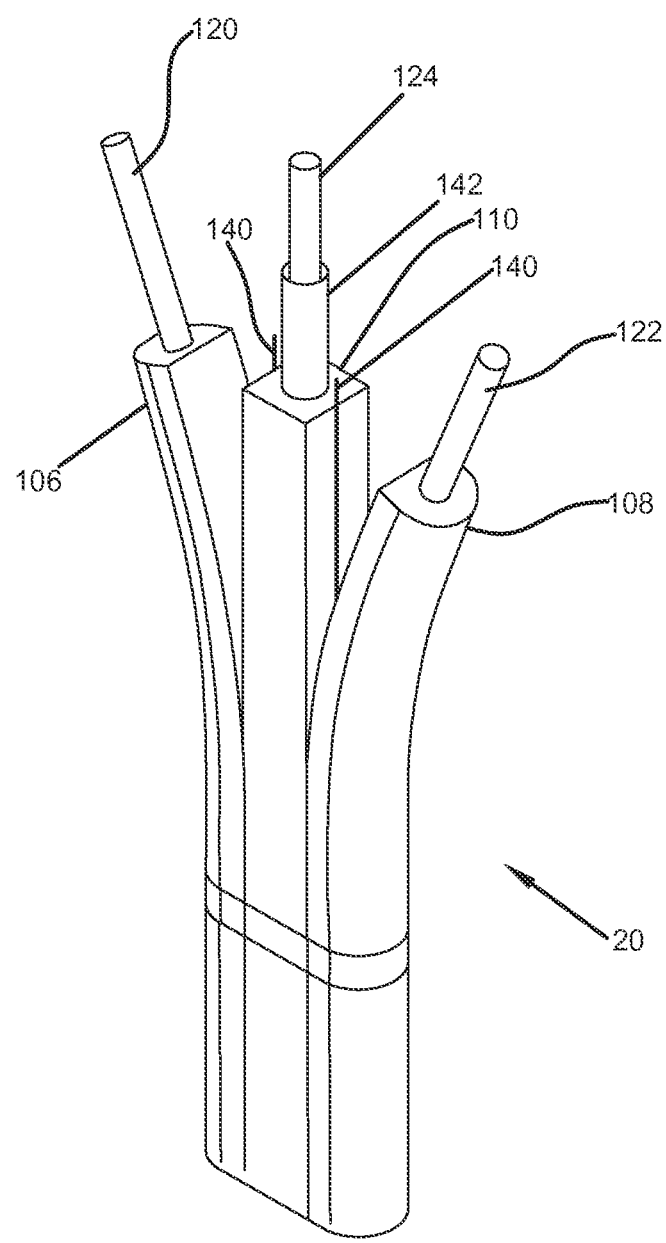
FIG. 3 is a perspective view of a portion of the hybrid cable of FIG. 2 with electrically conductive portions of the cable showing separated from a central optical fiber portion of the cable.

FIG. 3 shows the hybrid cable 20 with both the left portion 206 and the right portion 208 torn away from the central portion 210. In this configuration, both the left electrical conductor 220 and the right electrical conductor 222 are fully insulated by their corresponding left and right portions 206, 208. Additionally, the central portion 210 has a rectangular transverse cross-sectional shape that fully surrounds the central passage 216 so as to protect the optical fiber or fibers 224.

It will be appreciated that the left and right electrical conductors 220, 222 have a construction suitable for carrying electricity. It will be appreciated that the electrical conductors can have a solid or stranded construction. Example sizes of the electrical conductors include 12 gauge, 16 gauge, or other sizes.

The outer jacket 200 is preferably constructed of a polymeric material. In one example, the hybrid cable 20 and the outer jacket 200 are plenum rated. In certain examples, the outer jacket 200 can be manufactured of a fire-retardant plastic material. In certain examples, the outer jacket 200 can be manufactured of a low smoke zero halogen material. Example materials for the outer jacket include polyvinyl chloride (PVC), fluorinated ethylene polymer (FEP), polyolefin formulations including, for example, polyethylene, and other materials.

The central passage 216 can contain one or more optical fibers 224. In certain examples, the optical fibers 224 can be coated optical fibers having cores less than 12 microns in diameter, cladding layers less than 240 microns in diameter, and coating layers less than 300 microns in diameter. It will be appreciated that the core and cladding layers typically include a silica based material. In certain examples, the cladding layer can have an index of a refraction that is less than the index of refraction of the core to allow optical signals that are transmitted through the optical fibers to be confined generally to the core. It will be appreciated that in certain examples, multiple cladding layers can be provided. In certain examples, optical fibers can include bend insensitive optical fibers having multiple cladding layers separated by trench layers. In certain examples, protective coatings (e.g., a polymeric material such as actelate) can form coating layers around the cladding layers. In certain examples, the coating layers can have diameters less than 300 microns, or less than 260 microns, or in the range of 240 to 260 microns. In certain examples, the optical fibers 224 can be unbuffered. In other examples, the optical fibers can include a tight buffer layer, a loose buffer layer, or a semi-tight buffer layer. In certain examples, the buffer layers can have an outer diameter of about 800 to 1,000 microns. The optical fibers can include single mode optical fibers, multi-mode optical fibers, bend insensitive fibers or other fibers. In still other embodiments, the optical fibers 224 can be ribbonized.

Figure 4:
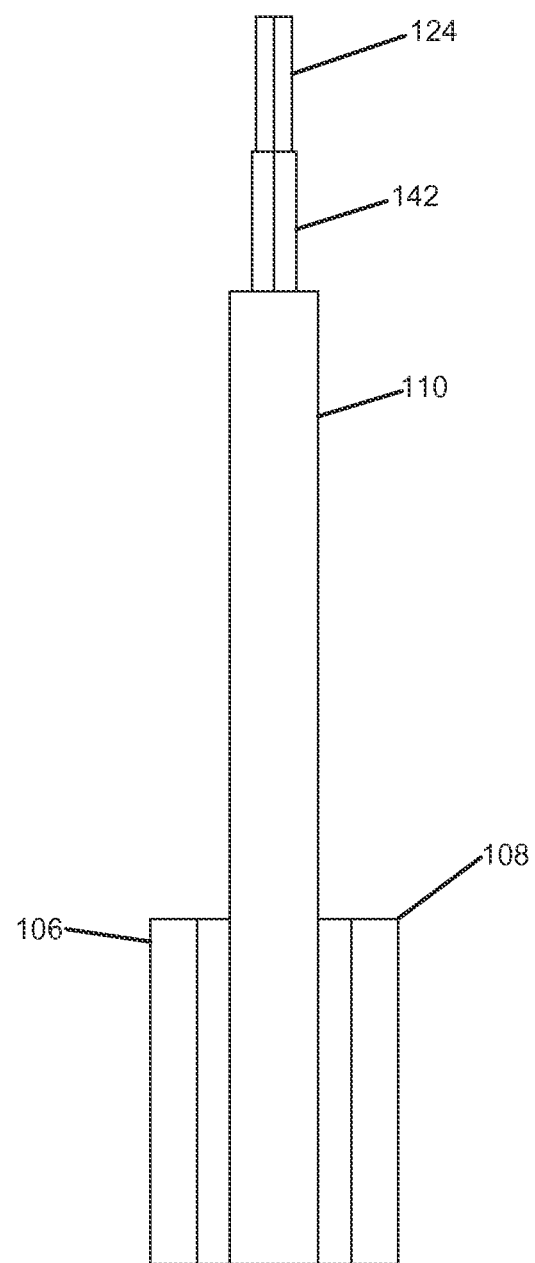
FIG. 4 is a plan view of the hybrid cable of FIGS. 2 and 3 with the electrically conductive portions of the hybrid cable trimmed relative to the central fiber optic portion of the hybrid cable.

As shown at FIG. 4, the left and right portions 206, 208 can be trimmed relative to the central portion 210 after the left and right portions 206, 204 have been torn away from the central portion 210. In this configuration, the central portion 210 extends distally beyond the ends of the left and right portions 206, 208. In certain examples, insulation displacement connectors can be used to pierce through the jacket materials of the left and right portions 206, 208 to electrically connect the left and right electrical connectors 220, 222 to an electrical power source, ground, active components or other structures. It will be appreciated that the optical fibers 224 can be connected to other fibers with mechanical or fusion splices, or directly terminated with optical connectors. In other examples, connectorized pigtails can be spliced to the ends of the optical fibers 224.

Referring back to FIG. 2, the outer jacket 200 includes a top side 230 and a bottom side 232 separated by the height H. As depicted, the top and bottom sides 230, 232 are generally parallel to one another. Each of the left and right pre-defined tear locations 226, 228 includes an upper slit 234 that extends downwardly from the top side 230, a lower slit 236 that extends upwardly from the bottom side 232 and a non-slitted portion 238 positioned between the upper and lower slits 234, 236. In one example embodiment, the upper and lower slits 234, 236 are partially re-closed slits. In the depicted embodiment, the left and right pre-defined tear locations 226, 228 also include jacket weakening members 240 that are imbedded in the non-slitted portions 238. By way of example, the jacket weakening members 240 can include strands, monofilaments, threads, filaments or other members. In certain examples, the jacket weakening members 240 extend along the central longitudinal axis 218 of the cable 20 for the length of the cable 20. In certain examples, the jacket weakening members 240 are aligned along the major axis 202. In certain examples, the upper and lower slits 230, 236 as well as the jacket weakening member 240 of the left pre-defined tear location 226 are aligned along a left tearing plane PL that is oriented generally perpendicular relative to the major axis 202. Similarly, the upper and lower slits 234, 236 as well as the jacket weakening member 240 of the right pre-defined tear location 228 are aligned along a right tearing plane PR that is oriented generally perpendicular with respect to the major axis 202.

Referring again to FIG. 2, the hybrid cable 20 can include a tensile strength structure 242 that provides tensile enforcement to the hybrid cable 20 so as to prevent tensile loads from being applied to the optical fibers 224. In certain embodiments, the tensile strength structure 242 can include reinforcing structures such as Aramid yarns or other reinforcing fibers. In still other embodiments, the tensile strength structure 242 can have an oriented polymeric construction. In still other examples, a tensile strength structure 242 can include a reinforcing tape. In certain examples, the reinforcing tape can be bonded to the outer jacket 200 so as to line the central passage 216. In certain examples, no central buffer tube is provided between the optical fibers 224 and the tensile reinforcing structure 242. In certain examples, the tensile strength structure 242 can include a reinforcing tape that extends along the length of the hybrid cable 20 and has longitudinal edges/ends 244 that are separated so as to define a gap 244 therein between. In use, the tensile strength member 242 can be anchored to a structure such as a fiber optic connector, housing or other structure so as to limit the transfer of tensile load to the optical fibers 224. It will be appreciated that the tensile strength structure 242 can be anchored by techniques such as crimping, adhesives, fasteners, bands or other structures.

Figure 5:
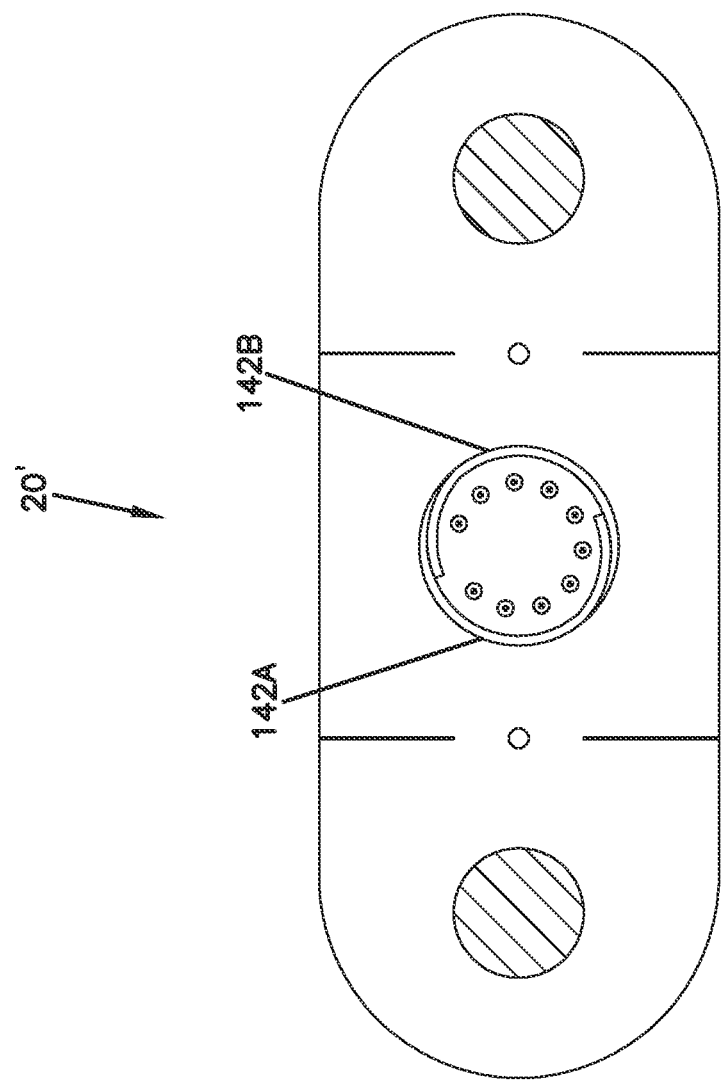
FIG. 5 is a transverse cross-sectional view of another power/optical fiber hybrid cable in accordance with principles of the present disclosure.

FIG. 5 shows an alternative hybrid cable 20' having the same construction as the hybrid cable 20 except two tensile strength structures 242A, 242B have been provided within the central passage 216. Tensile strength members 242A, 242B each include a tensile reinforcing tape that is bonded to the central portion 210 of the outer jacket 200. The tensile strength members 242A, 242B can include portions that circumferentially overlap one another within the central passage 216. In certain examples, by stripping away an end portion of the central portion 210, the tensile strength structures 242A, 242B can be exposed and readily secured to a structure such as a fiber optic connector, a panel, a housing or other structure.

As noted above, the electrical conductors 220, 222 could be 12 gauge (AWG) or 16 gauge, for example. In certain examples, a 12 gauge conductor 220, 220 provides up to 1175 meter reach at 15 W, and a 750 meter reach for 25 W devices. The 16 gauge implementations can provide reduced cost for shorter reach applications or lower power devices, for example.

Providing power to remote active devices such as the wireless coverage area defining equipment 12 is often difficult and expensive. Providing required power protection and backup power further complicates powering such remote devices. Optical Network Terminals (ONT's) and Small Cell devices (such as picocells and metrocells) have "similar" power requirements. For example, 25 W, 12 VDC or 48 VDC devices are common, although variations occur.

Figure 6:
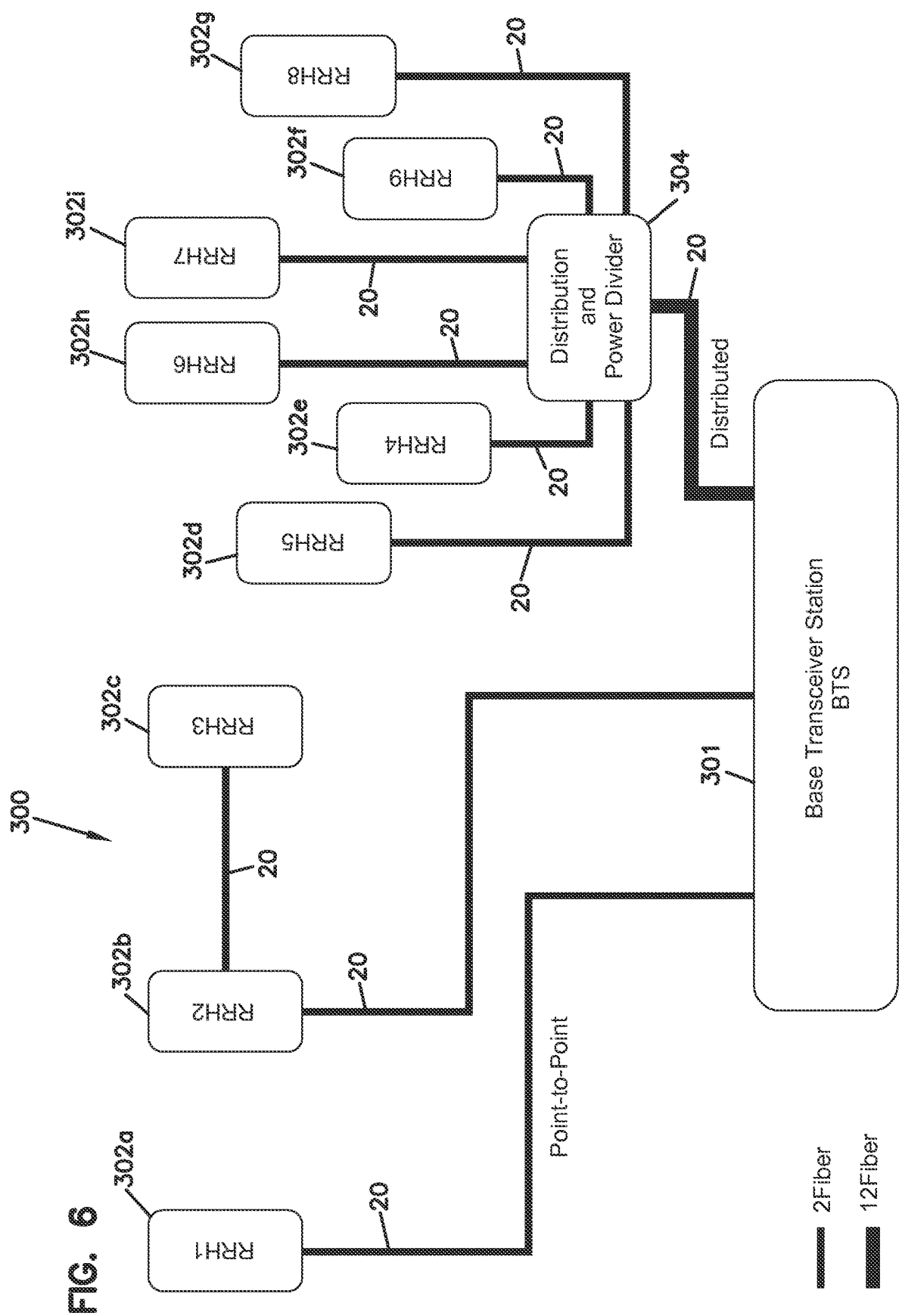
FIG. 6 shows an example topography for transmitting power and optical signals between a BTS and an arrangement of remote radio heads.

FIG. 6 shows an example mobile network topology 300 for transmitting optical signals and power between a base transceiver station 301 and a plurality of remote radio heads 302a-302i (i.e., remote transceivers). It will be appreciated that the hybrid cable 20 can be incorporated throughout the network topology 300 for transmitting both optical signals and power between the base transceiver station 301 and the remote radio heads 302a-302i. For example, the remote radio heads 302a, 302b are shown connected point-to-point with the base transceiver station 301. In such examples, the hybrid cables 20 routed between the base transceiver station 301 and the radio heads 302a, 302b can each include two optical fibers. The radio head 302c is shown coupled to the radio head 302b in a daisy-chain type configuration by another 2-fiber hybrid cable 20. The radio heads 302d-302i are shown integrated with the base transceiver station 301 through a distributed network configuration. The distributed network configuration includes a distribution box 304 coupled to the base transceiver station 301 by a multi-fiber (e.g., a 12 fiber) version of the hybrid cable 20. At the distribution box 304, the optical fibers of the multi-fiber fiber hybrid cable 20 are separated (e.g., fanned-out or otherwise segregated or broken out into pairs) and the power is split. Two fiber versions of the hybrid cable 20 are used to distribute power and optical connectivity from the distribution box 304 to the various remote radio heads 302d-302i.

Figure 7:
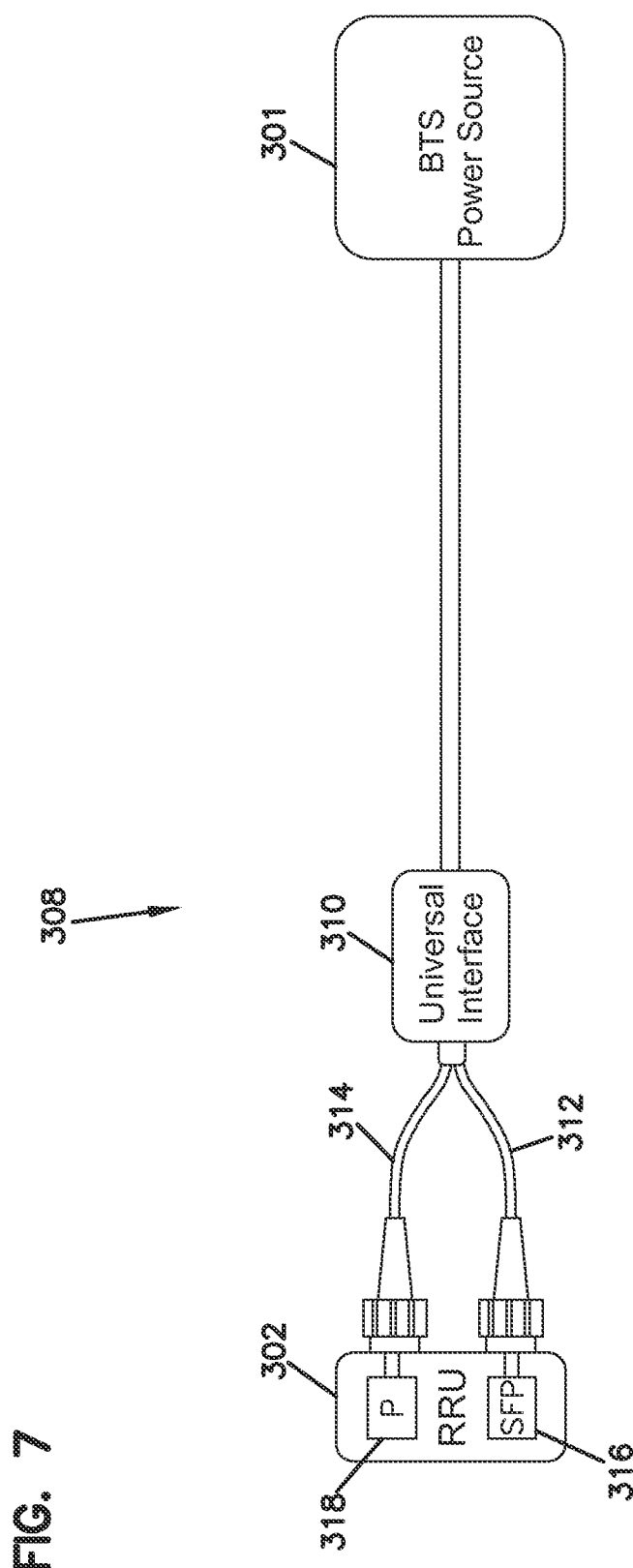
FIG. 7 shows an example configuration for providing power and optical signals from a BTS to remote radio heads.
Figure 9:
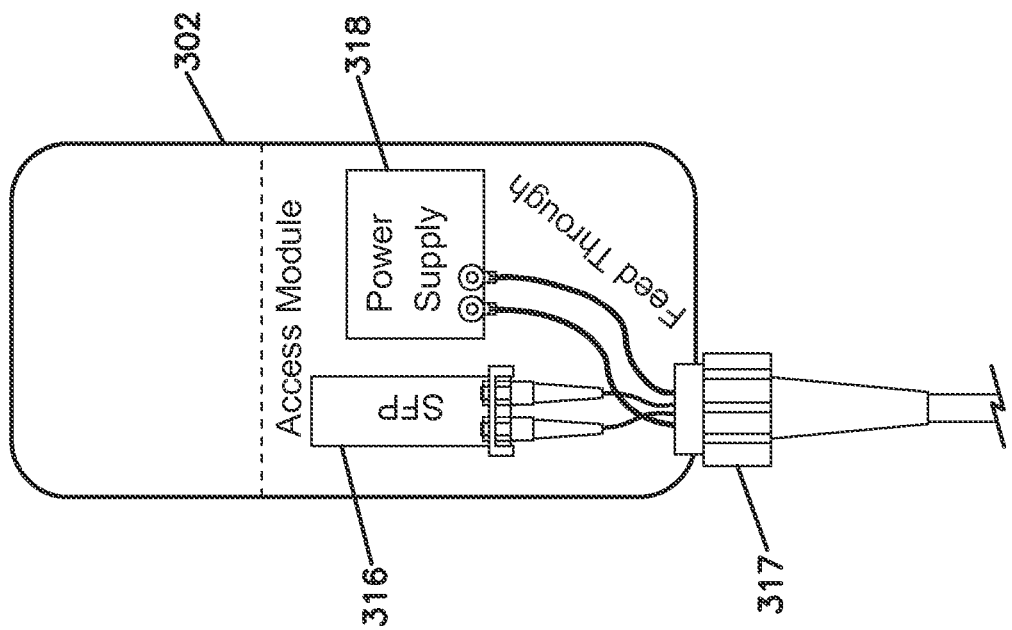
FIG. 9 shows a remote radio head with a ruggedized connection providing both power and optical signals.
Figure 8:
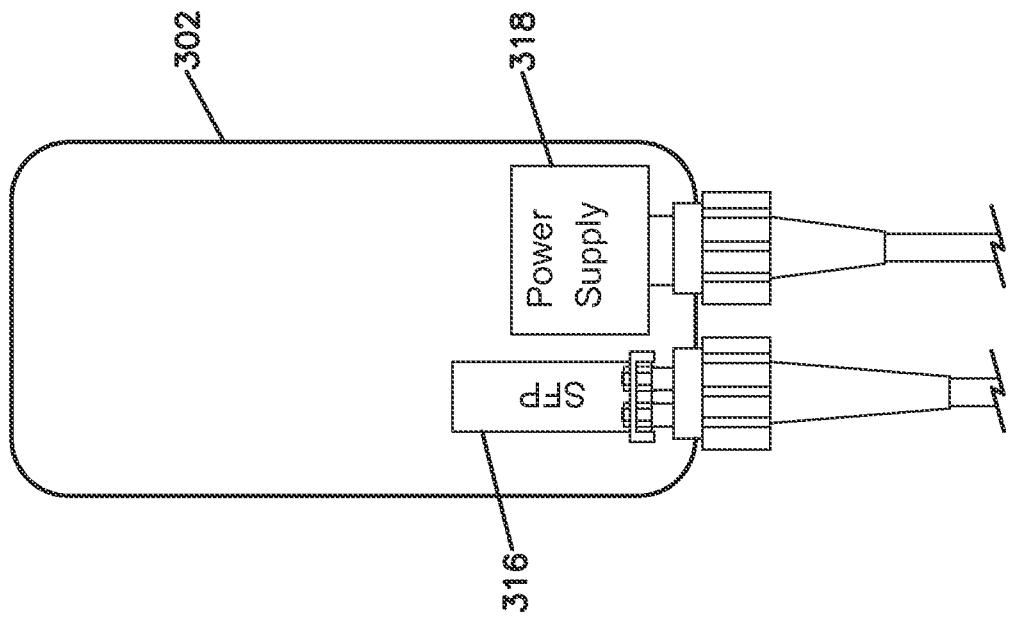
FIG. 8 shows a remote radio head with separate ruggedized power and optical connectors.
Figure 10:
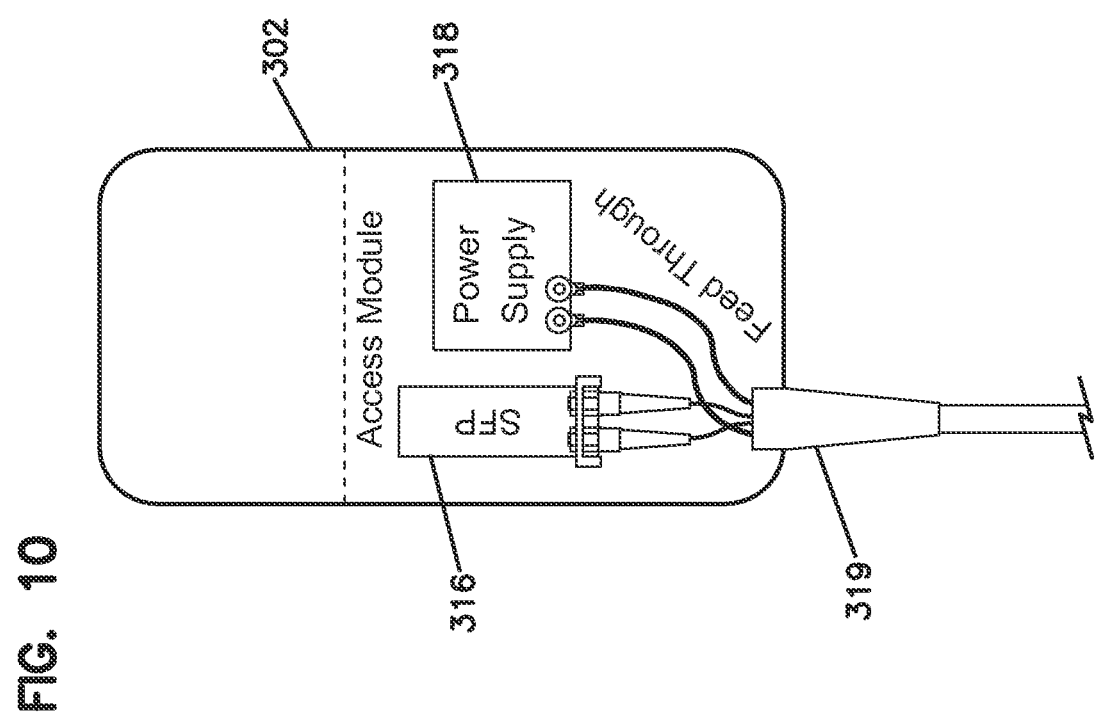
FIG. 10 shows a remote radio head with a boot that transitions power and optical signals into the remote radio head.

FIG. 7 shows an example configuration 308 for providing power and fiber optics to one of the remote radio heads 302 from the base transceiver station 301. In this example, the hybrid cable 20 is routed from the base transceiver station 301 to a universal interface 310. The universal interface 310 can provide power management, surge suppression, media conversion and can also separate the fiber optics from the power. In one example, the universal interface 310 can have a configuration of the type disclosed in U.S. provisional patent application No. 61/846,392, filed Jul. 15, 2013, which is hereby incorporated by reference in its entirety. One of the hybrid cables 20 can be used to provide power and optical signals from the base transceiver station 301 to the universal interface 310. At the universal interface 310, the optical signals can be routed to a two-fiber optical output line 312 and the power can be routed to a power output line 314. The optical line 312 can be coupled to a small form-factor pluggable transceiver 316 of the remote radio head and the power line 314 can be coupled to a power supply 318 of the radio head. In certain examples, the lines 312, 314 can include sealed interfaces at the housing of the remote radio head and can include connectors such as edge mounted connectors corresponding to the power supply and the small form-factor pluggable transceiver (see FIG. 8). In other examples, the interconnection between the remote radio head 302 and the universal interface 310 can be made with a single line hybrid that carries both fiber optic signals and power to the remote radio head. For example, FIG. 9 shows a version having a panel-mount sealed connector 317 with feed through lines routed to the small form-factor pluggable transceiver 316 and the power supply 318. FIG. 10 shows a version where a panel mounted sealed boot 319 protects an interface between the hybrid cable and the housing of the remote radio head 302. The fiber optics and power are fed through the boot and connected to the small form-factor pluggable transceiver 316 and the power supply 318.

Figure 11:
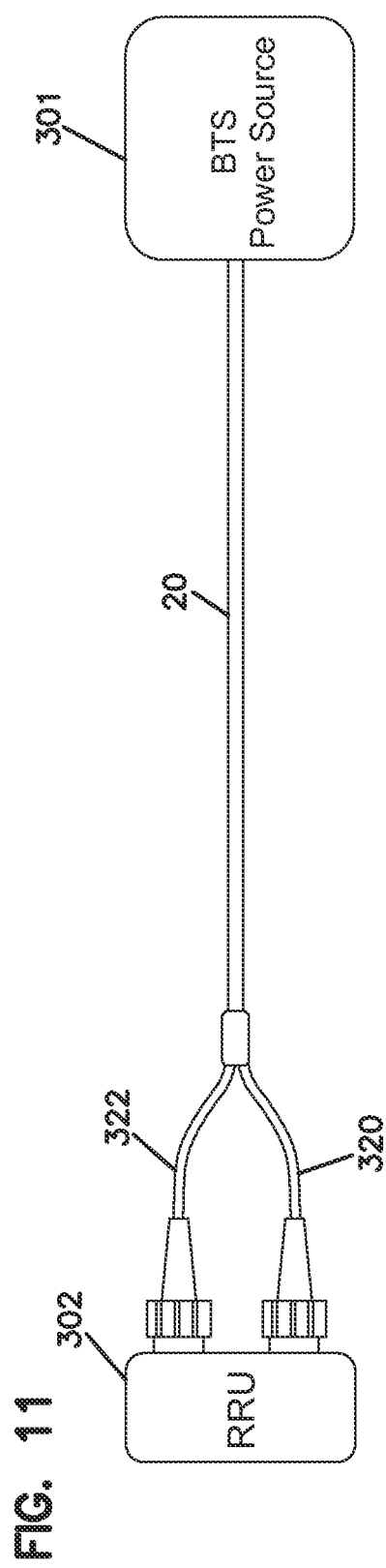
FIG. 11 shows another configuration for transmitting power and optical signals between a BTS and a remote radio head.

FIG. 11 shows another connectivity design where the universal interface 310 has been eliminated because power management, surge suppression and media conversion are provided in the equipment (e.g., in the remote radio head and/or in the base transceiver station). As shown at FIG. 11, the hybrid cable 20 is bifurcated into a separate optical branch 320 and a power branch 322 which are coupled to the small form-factor pluggable transceiver and the power supply of the remote radio head 302.

Figure 12:
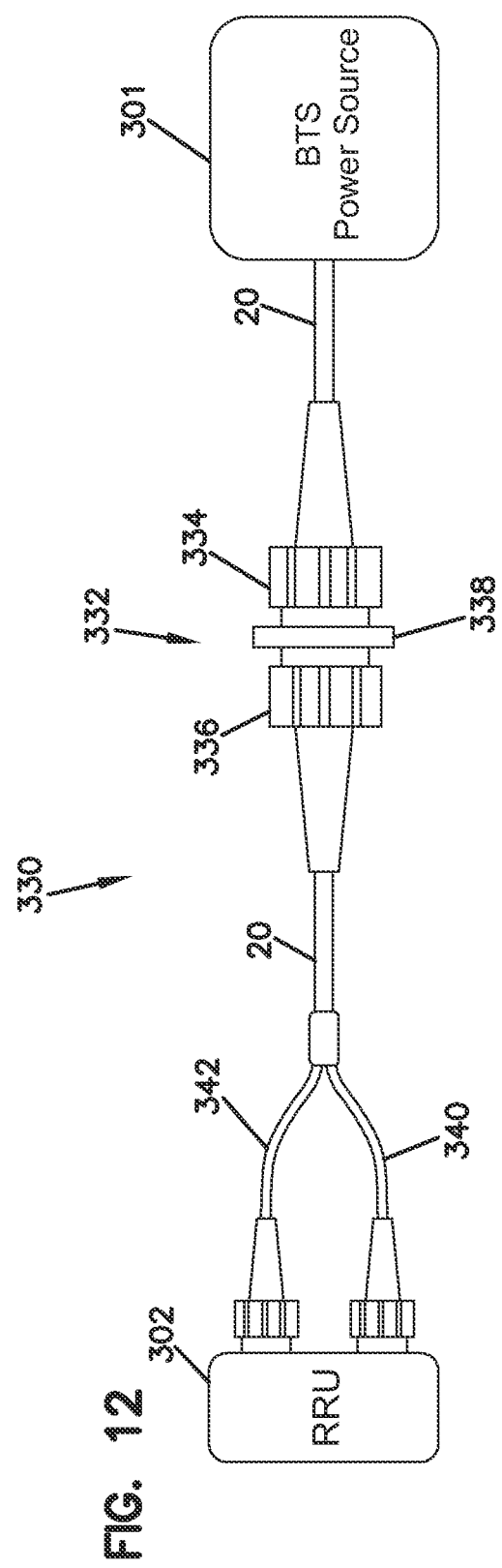
FIG. 12 shows still another configuration for transmitting power and optical signals between a BTS and a remote radio head.

FIG. 12 shows another connectivity design 330 for conveying power and fiber optic signals between the transceiver station 301 and a remote radio head 302. The connectivity design 330 includes an intermediate hardened optical power connection system 332. The hardened optical and power connection system 332 includes a hardened optical and power plug 334 that interfaces with a hardened optical and power socket 336. An intermediate fixture 338 can be used to assist in providing a more robust mechanical connection between the plug 334 and the socket 336. The plug 334 is mounted at the end of a hybrid cable 20 routed from the base transceiver station 301. The socket 336 is coupled to a hybrid cable 20 that is part of a harness or cable assembly having an optical branch 340 coupled to the small form-factor pluggable transceiver of the radio head and a power branch 342 coupled to the power supply of the remote radio head 302.

Figure 13:
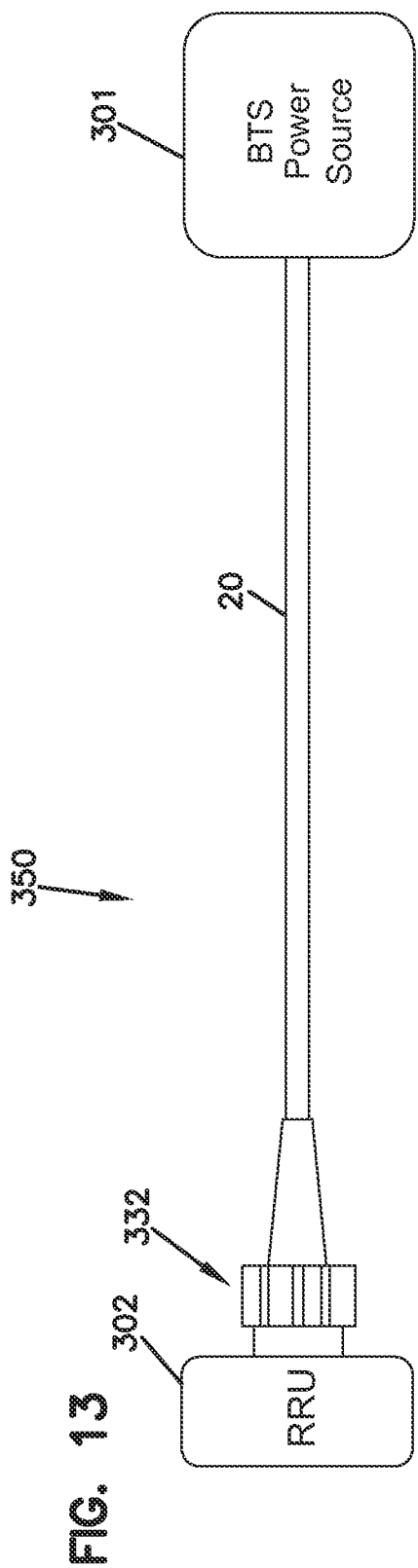
FIG. 13 shows a further configuration for transmitting power and optical signals between a BTS and a remote radio head.

FIG. 13 shows a connectivity design 350 where the hardened optical and power connection system 332 is used to provide an interface directly with the remote radio head 302. One of the hybrid cables 20 is routed from the base transceiver station 301 to the hardened optical power and connection system 332. In certain examples, the hardened optical power connection system 332 connected to the remote radio head 302 can include the plug 334 or the socket 336 of the hardened optical and power connection system 332. In other examples, both the plug 334 and the socket 336 can be provided.

Figure 14:
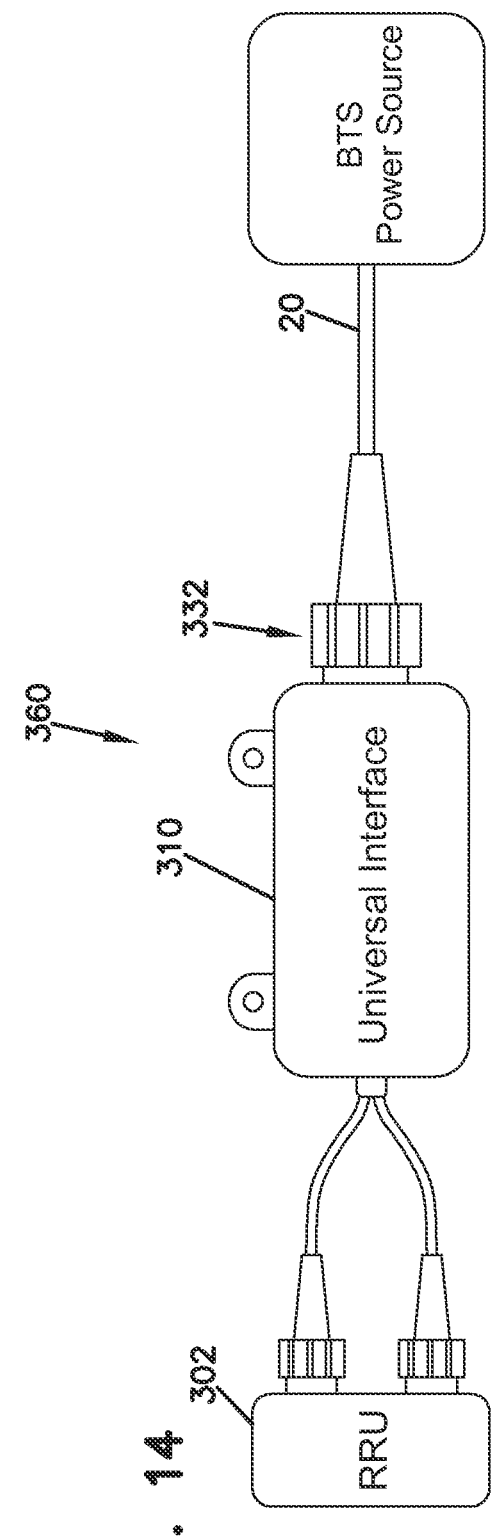
FIG. 14 shows a further configuration for transmitting power and optical signals between a BTS and a remote radio head.

FIG. 14 shows a further connectivity design 360 that is similar to the design 308. The design 360 has been modified to include the hardened optical and power connection system 332 at the universal interface 310. In this way, the hybrid cable 20 routed from the base transceiver station 301 to the universal interface 310 can be plugged into the universal interface 310 using a plug-and-play configuration. In this way, power and optics can be interconnected to the universal interface 310 with a single plug-and-play style connector. This type of configuration eliminates the need to open the universal interface box for fiber management and for splicing. It will be appreciated that the outputs from the universal interface 310 can be provided with a variety of different connector styles or combinations of interfaces to accommodate remote radio units having different connector styles. In this way, backward compatibility is enhanced. It will be appreciated that the outputs from the universal interface can include separate optical and power branches or a combined optical and power line formed by a hybrid cable.

Figure 15:
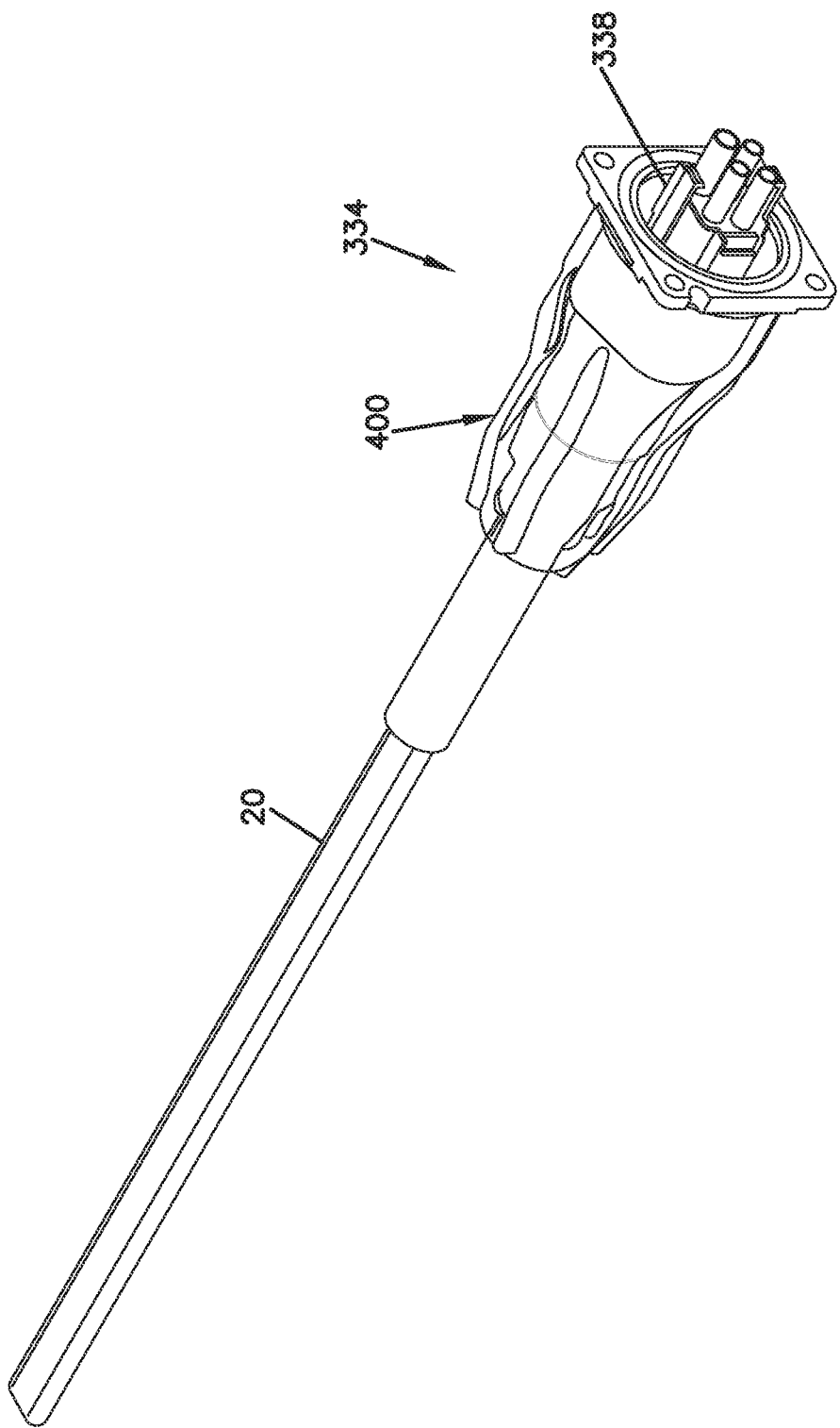
FIG. 15 shows an example hybrid plug in accordance with the principles of the present disclosure.
Figure 16:
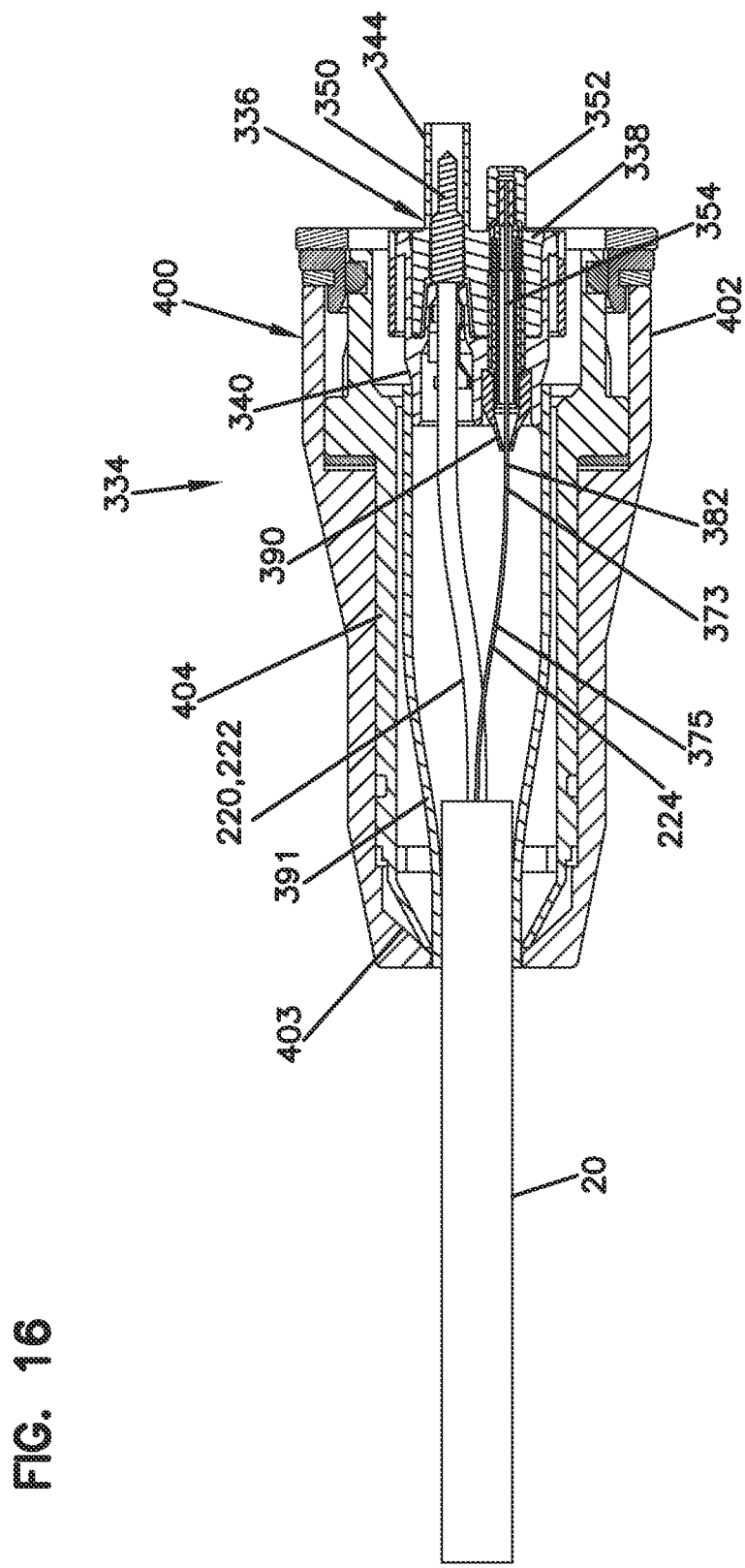
FIG. 16 is a cross-sectional view of the hybrid plug of FIG. 15.
Figure 17:
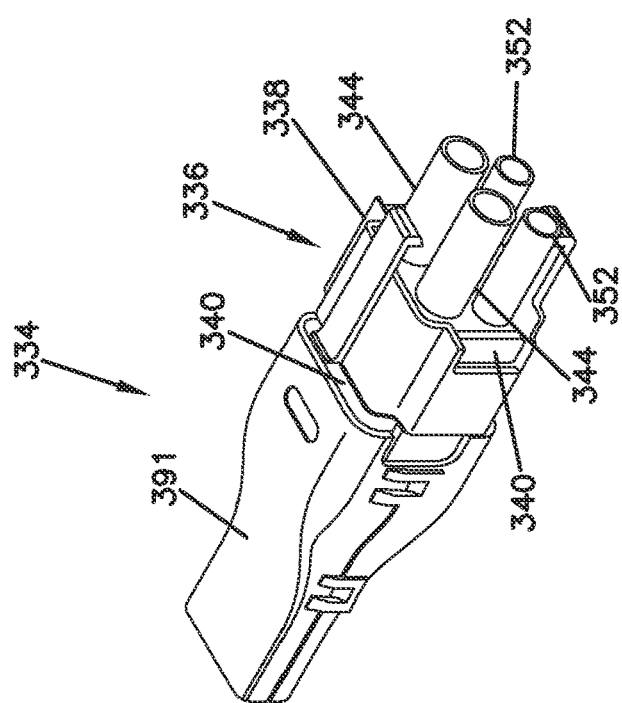
FIG. 17 is a perspective view of internal components of the hybrid plug of FIGS. 15 and 16.

Referring to FIGS. 15-17, the plug 334 of the hardened optical and power connection system 332 is depicted. The plug 334 includes a plug body 336 including a plug housing 338 coupled to a rear body 340. In one example, the plug housing 338 and the rear body 340 are coupled together by a snap-fit connection. In certain examples, the plug housing 338 and the rear body 340 are made of a dielectric material such as plastic. In the depicted example, the plug housing 338 includes a main body 342 having a generally angular transverse cross-sectional profile. It will be appreciated that the rear body 340 also has a generally rectangular transverse cross-sectional profile that matches the transverse cross-sectional profile of the main body 342 of the plug housing 338. The plug housing 338 also includes first and second sleeves 344, 352 that project forwardly from the main body 342. The first sleeve 344 and the second sleeve 352 each have a unitary construction with the main body. The first sleeves 344 receive pin contacts 350 (see FIG. 25). The plug housing 338 also includes second sleeves 352 that receive optical terminals 354 (see FIG. 24). During assembly, the pin contacts 350 are loaded into the first sleeves 344 through the back end of the plug housing 338. Similarly, the optical terminals 354 are loaded into the second sleeves 352 through the back side of the plug housing 338. Once the pin contacts 350 and the optical terminals 354 have been loaded into their corresponding sleeves 344, 352, the rear body 340 is coupled to the back side of the plug housing 338 thereby capturing and retaining the optical terminals 354 and the pin contacts 350 within the plug body 336.

Referring to FIG. 25, contact pins 350 include first ends 358 positioned opposite from second ends 360. The first ends 358 define pins 362. The second ends 360 define structure for electrically and mechanically coupling the pin contacts 350 to the electrical conductors 220, 222 of the hybrid cable 20. To couple the electrical conductors 220, 222 to the pin contacts 350, the left and right portions 206, 208 of the hybrid cable 20 are separated from the central portion 210. End segments of the insulation surrounding the separated electrical conductors 220, 222 are then stripped thereby exposing the electrical conductors 220, 222. The exposed portions of the electrical conductors 220, 222 can be inserted into receptacles 364 (i.e., openings, passages, etc.) of the pin contacts 350 thereby making electrical contact with the pins 362. Retainers 366 of the pin contacts 350 can be clamped, crimped or otherwise pressed into engagement with the conductors thereby providing a mechanical connection between the electrical conductors 220, 222 and the corresponding pin contacts 350. Additionally, retaining elements 368 can be clamped against the insulation portions 206, 208 surrounding the electrical connectors 220, 222.

As shown at FIG. 16, when the pin contacts 350 are installed within the plug 334, the first ends 358 are positioned within the first sleeves 344 and the second ends 360 are positioned within the rear body 340. The rear body 340 has enlarged openings for accommodating the second ends 360 of the pin contacts 350. The first sleeves 349 can be internally tapered so as to provide a friction fit with intermediate regions of the pin contacts 350 thereby limiting the range of forward movement permitted by the pin contacts 350 within the first sleeves 344. End faces 368 of the rear body 340 can oppose or abut against shoulders 370 defined by the intermediate regions of the pin contacts 350 thereby effectively retaining the contact pins 350 within the first sleeves 344.

Figure 24:
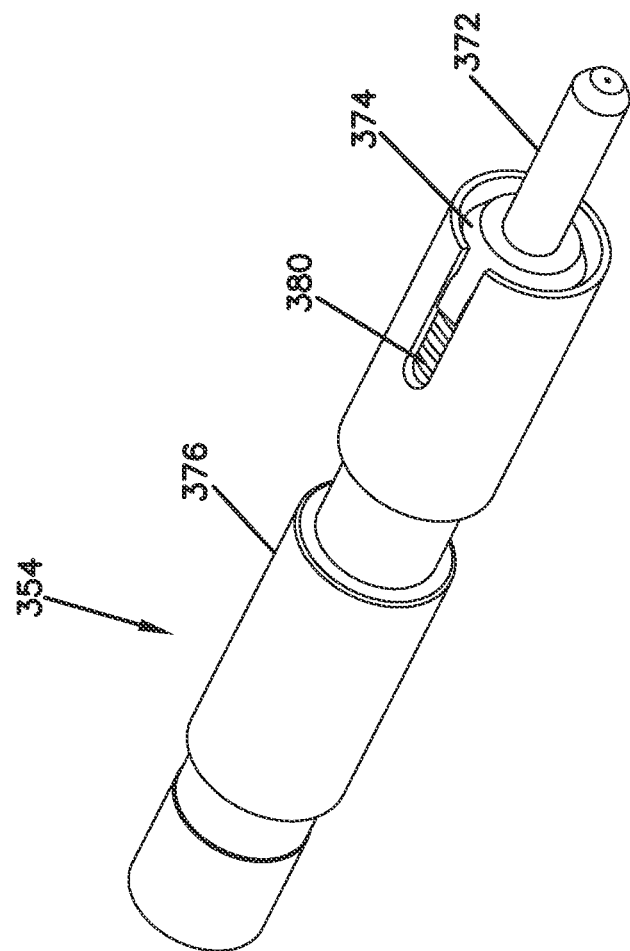
FIG. 24 is a perspective view of an optical terminal in accordance with the principles of the present disclosure.

Referring to FIG. 24, the optical terminals 354 include ferrules 372 having base ends supported at hubs 374. In certain examples, ferrules 372 can be constructed of a relatively hard material such as ceramic or metal. In certain examples, the ferrules 372 can have polished end faces. It will be appreciated that the end faces of the ferrules 372 can be angled or perpendicular relative to central axes of the ferrules. The ferrules 372 defined central passages that extend along the central axes. The passages are adapted for receiving optical fibers that can be secured (e.g., bonded, potted, etc.) within the central passages. The hubs 374 are captured within insert bodies 376. In the depicted example, the insert bodies 376 are generally cylindrical sleeves, but other shapes could be used as well. In certain examples, the insert bodies 376 can include one or more exterior annular grooves 378. The hubs 374 can have chamfered front ends that engage against corresponding retaining features provided at front ends of the insert bodies 376 to prevent the hubs 374 from being pushed out of the front ends of the insert bodies. Springs 380 are positioned within the insert bodies 376 for biasing the hubs 374 and the corresponding ferrules 372 in a forward direction. In this way, the chamfered end of the hub 372 is biased against the retaining features of the insert bodies 376.

It will be appreciated that the ferrule and hub assemblies as well as the springs 380 can be loaded into the insert bodies 376. Thereafter, spring stops can be used to capture the springs 380 and the hubs assembly within the insert body 376 and to compress the spring 380 within the insert body 376. As depicted, the insert body can include front and rear portions that are coupled together to capture the spring and the hub within the insert body 376.

In certain examples, the ferrules 372 support optical fibers 373 having stub ends 382 that can be spliced or otherwise optically connected to the optical fibers of the hybrid cable 20. In certain examples, the splice location 375 can be housed within the insert body 376 or outside the insert body 376 (as shown at FIG. 16). It will be appreciated that the optical terminals 354 can be loaded into their corresponding second sleeves 352 by inserting the optical terminals 354 into the second sleeves 352 through the back side of the plug housing 338. Once the optical terminals 354 and the pin contact 350 have been loaded within the plug housing 338, the rear body 340 can be attached to the back end of the plug housing 338 to capture the optical terminals 354 and the contact pins 350 within the plug body 336. In certain examples, a boot 390 or other structure can be mounted at the back ends of the insert bodies 376 to protect and guide optical fibers as the optical fibers are routed out of the rear body 340. Additionally, as shown at FIG. 17, a strain relief member 391 (e.g., plastic boot or shell) can be mounted over the back end of the rear body 342 to assist in transitioning the electrical conductors as well as the optical fibers from the plug 334 to the cable.

It will be appreciated the plug 334 can also be provided with structure for providing environmental sealing as well as the ability to accommodate enhanced pull-back loads and side loads. For example, the plug body 336 can be mounted within a protective enclosure 400 including an outer body 402 and an inner body 404. The outer body 402 can include a sleeve having a coupling structure (e.g., threads, a bayonet interface, a snap-fit interface or other type of interface) adapted to provide a mechanical coupling with the fixture 338. The outer body 402 can also provide sealing relative to the fixture 338 as well as sealing against the jacket of the cable 20. In certain examples, the tensile strength structure 242 of the cable 20 can be secured (e.g., adhesively bonded to, crimped against, or otherwise attached) to either the inner body 404 or the outer body 402. Further description of the enclosure 400 can be found at U.S. Pat. No. 8,556,520 which is hereby incorporated by reference in its entirety. In certain examples, the outer body 402 can have a ramp 403 or other type of structure adjacent its rear end that compresses a seal about the jacket of the cable 20 thereby providing effective sealing at the back end of the enclosure 400. The inner body 404 can be configured for supporting and/or housing the plug body 336. In certain examples, seals can be provided on or around the inner body 404 for providing sealing with the fixture 338. In certain examples, a strain relief boot or other structure can be mounted to the rear end of the outer body 402 to provide strain relief protection at the junction between the outer body 402 and the cable 20.

Figure 19:
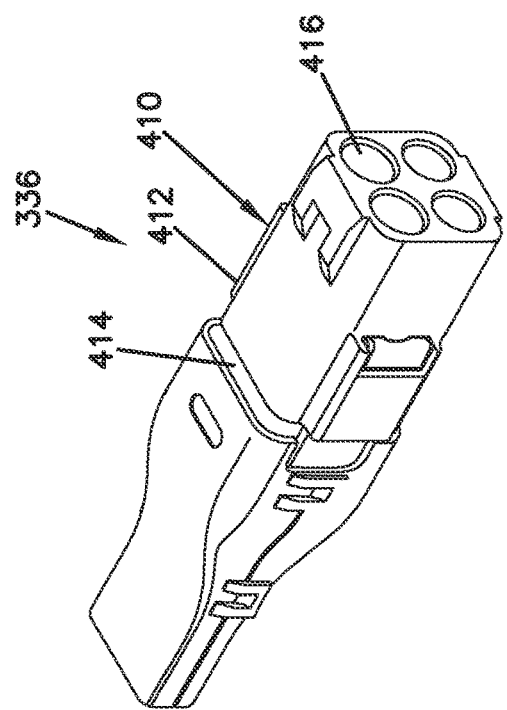
FIG. 19 is a perspective view of inner components of the hybrid socket of FIG. 18.
Figure 18:
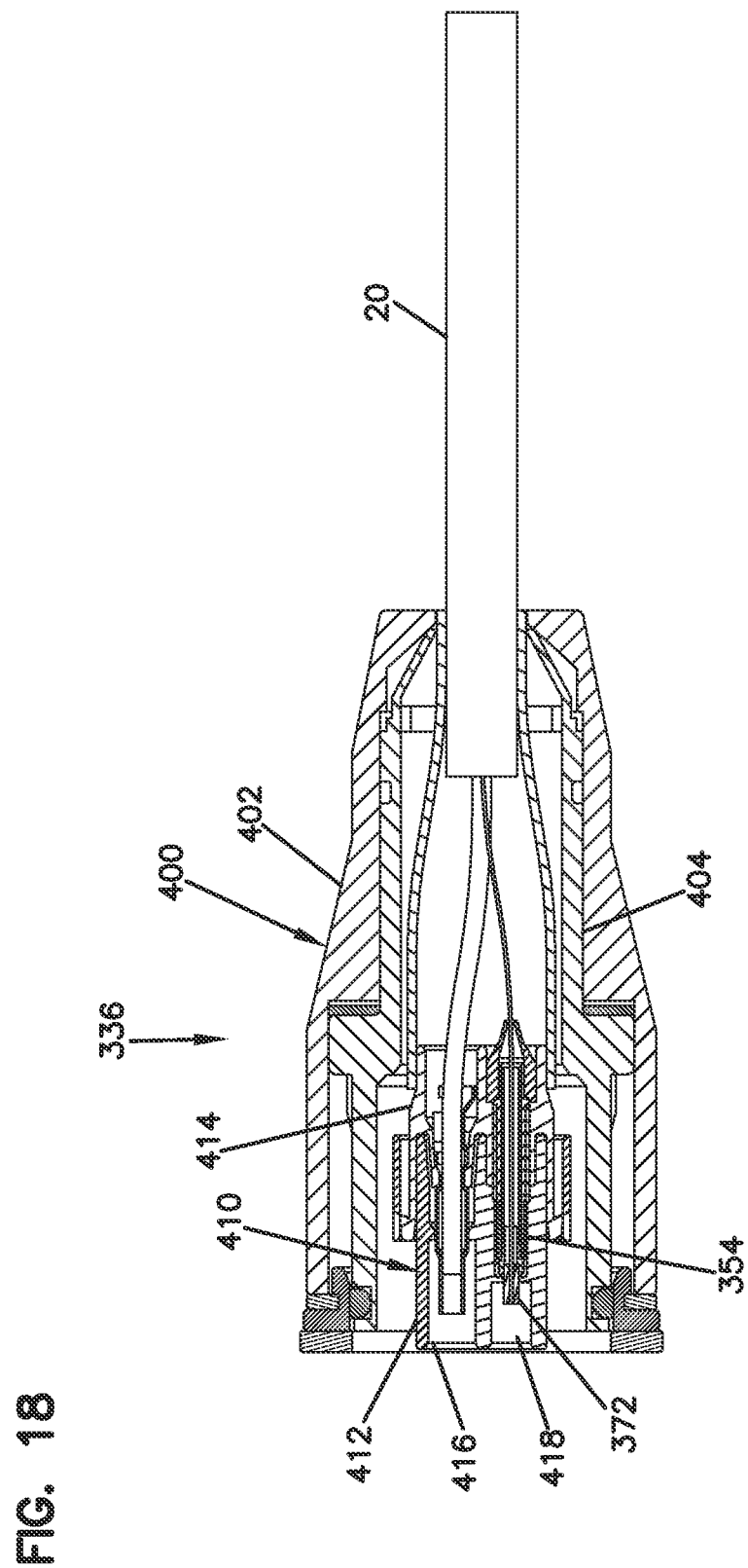
FIG. 18 is a cross-sectional view of a hybrid socket in accordance with the principles of the present disclosure.

Referring to FIGS. 18 and 19, the socket 336 is adapted to mate with the plug 334 and can be protected within an enclosure 400 of the same type described with respect to the plug 334. The socket 336 includes a socket body 410 including a socket housing 412 and a rear body 414. The socket housing 412 and the rear body 414 can be coupled together by a mechanical interface such as a snap-fit connection or other type of connection. The socket housing 410 includes a front end defining first receptacles 416 for receiving the first sleeves 344 of the plug 334 and second receptacles 418 for receiving the second sleeves 352 of the plug 334. The front end of the socket housing 412 has a generally rectangular transverse cross-sectional profile. The first receptacles 416 receive socket contacts 420 (see FIG. 26). The socket contacts 420 include first ends 422 and opposite second ends 424. The first ends 422 of the socket contacts 420 define electrical sockets 426 that receive the pins 362 of the plug 34 when the plug 334 and the socket 336 are mated together. Similar to the pin contacts 350, the socket contacts 420 have passages for receiving the electrical conductors of the hybrid cable 20 and one or more clamps, retainers, fasteners or other structures for effectively mechanically and electrically connecting the socket contacts 420 to the electrical conductors of the cable 20. In certain examples, the socket contacts 420 can also include structure for mechanically affixing the socket contacts 420 relative to the insulation surrounding the electrical conductors 220, 222.

The second receptacles 418 of the socket housing 412 are configured to receive optical terminals 354 of the same type previously described with respect to the plug 334. The optical terminals 354 are captured within the plug body 410 between the socket housing 412 and the rear body 414. As so positioned, the ferrules 372 of the optical terminals 354 are positioned within the second receptacles 418 with end faces of the ferrules facing in a forward direction.

Figure 20:
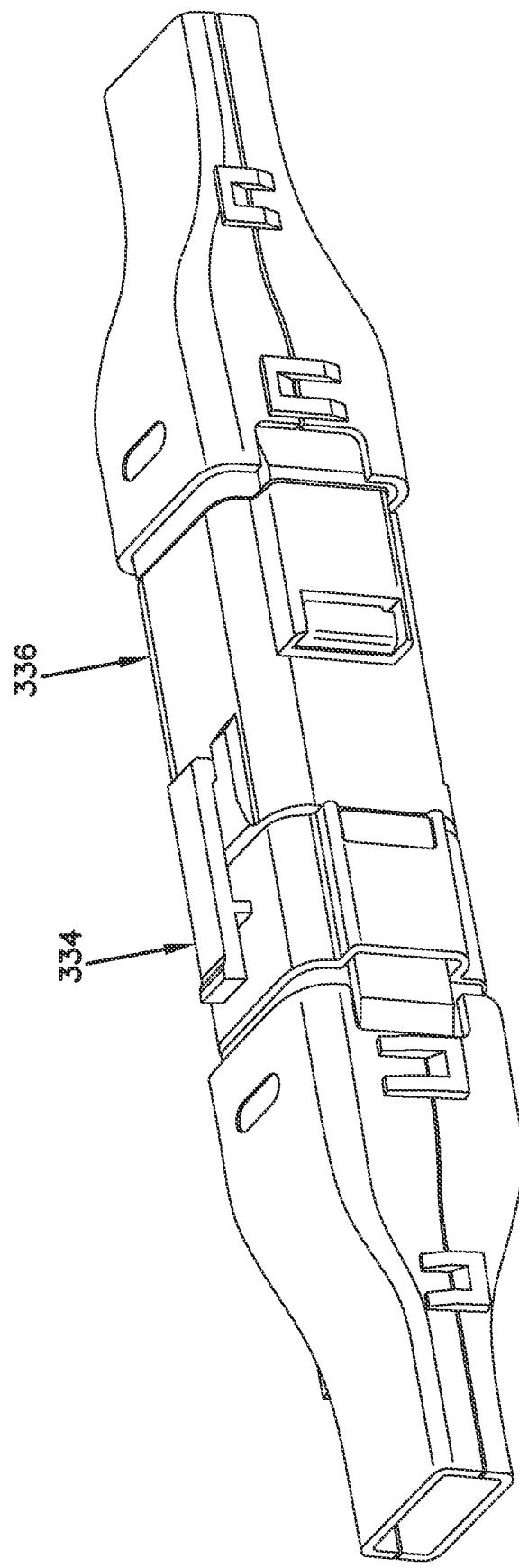
FIG. 20 shows the hybrid plug of FIG. 16 coupled to the hybrid socket of FIG. 18.
Figure 21:
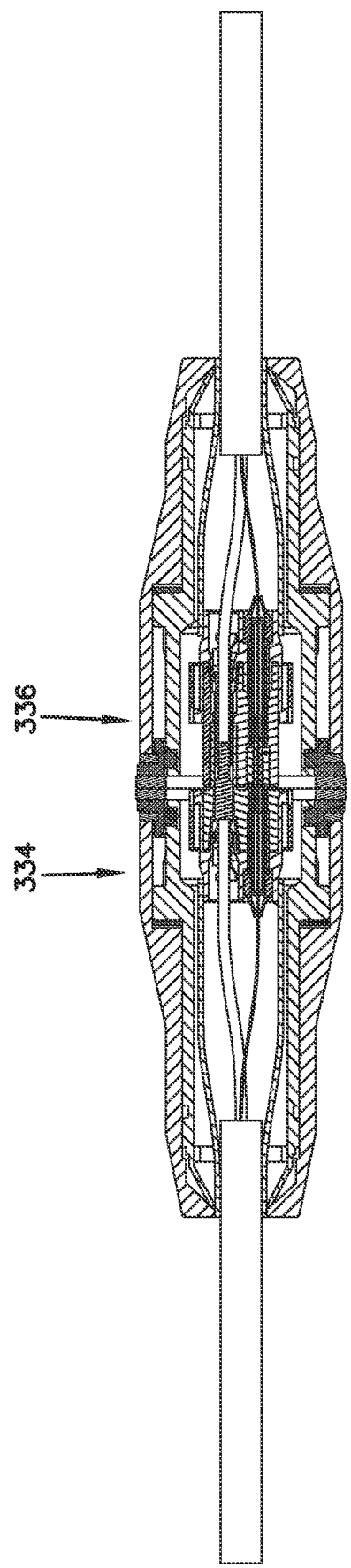
FIG. 21 is a cross-sectional view showing the hybrid plug of FIG. 16 pulled to hybrid socket of FIG. 18.
Figure 22:
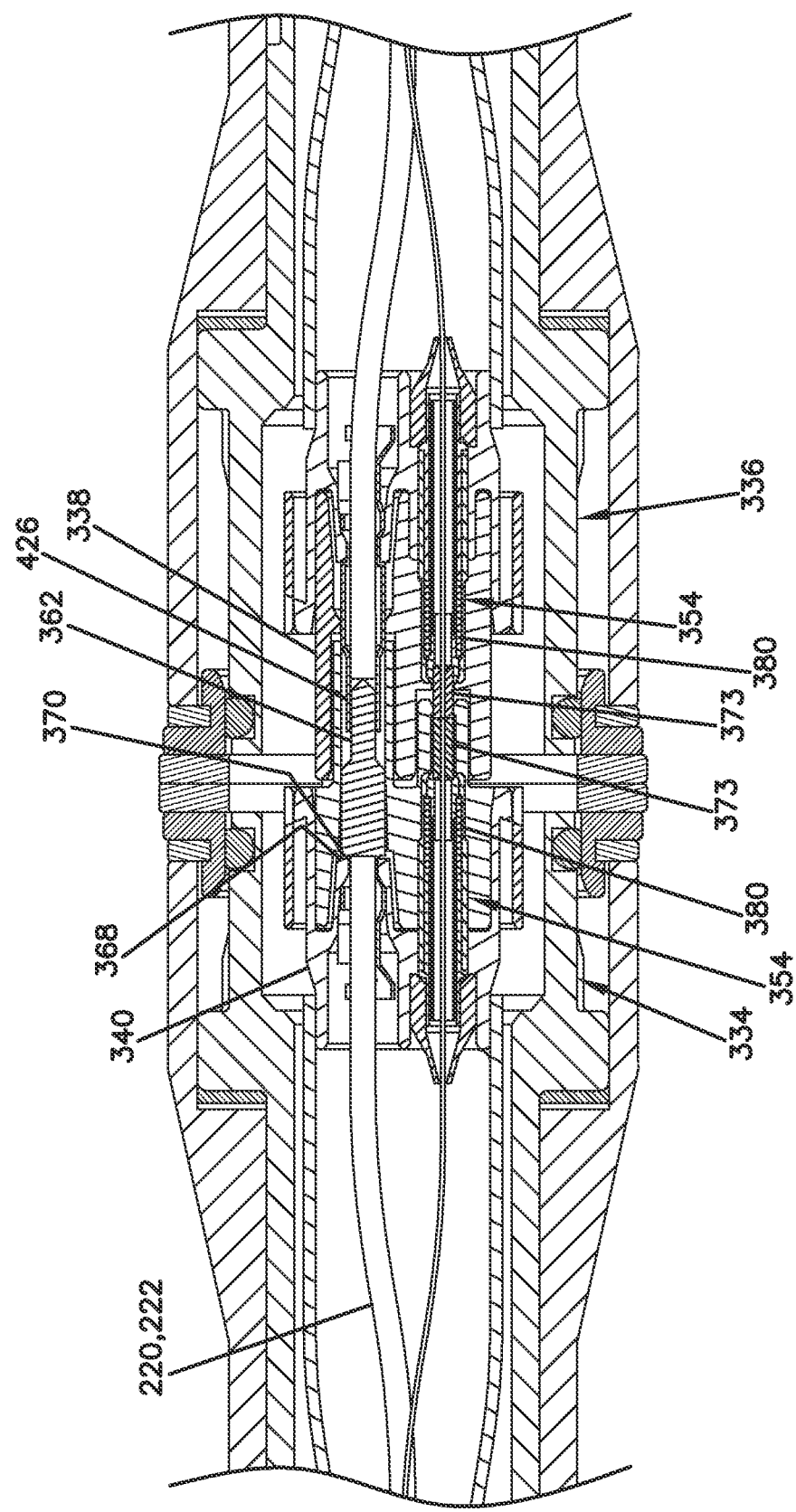
FIG. 22 is an enlarged view of a portion of FIG. 21.
Figure 23:
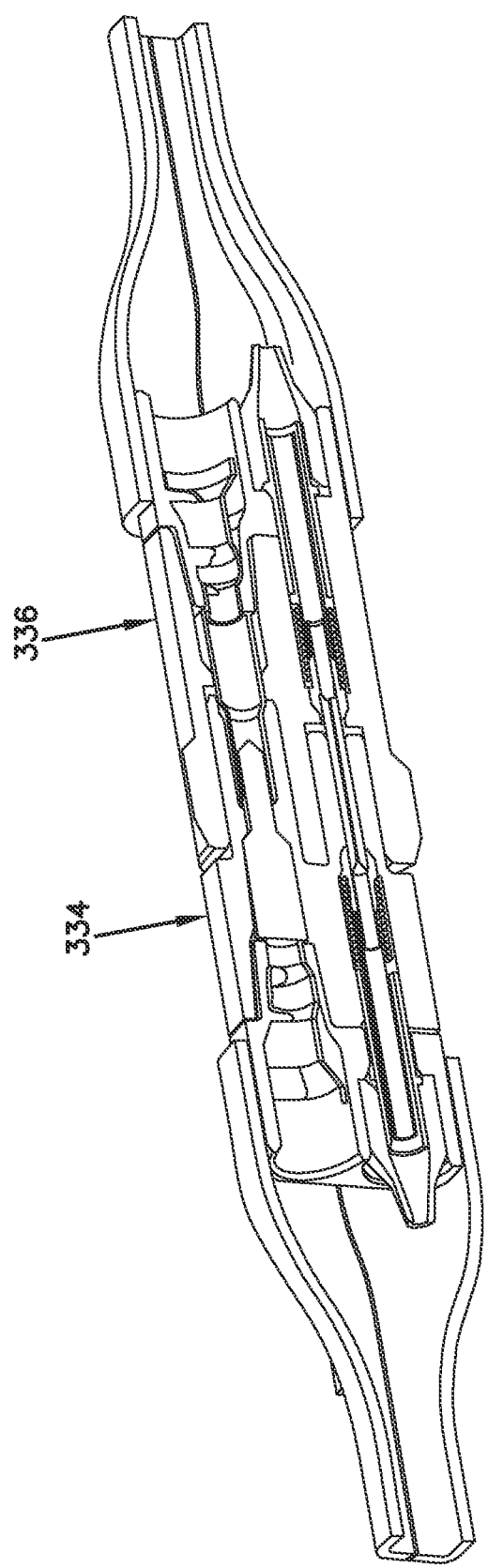
FIG. 23 is a further view showing the hybrid plug of FIG. 16 coupled to the hybrid socket of FIG. 18.

FIGS. 20-22 show the plug 334 and the socket 336 mated together. It will be appreciated that latches or other structures can be provided for mechanically interlocking the plug 334 and the socket 336. When the plug 334 and the socket 336 are mated together, the first sleeves 344 of the plug 334 fit within the first receptacles 416 of the socket 336. Additionally, second sleeves 352 of the plug 334 fit within the second receptacle 418 of the socket 336. As so mated, the pins 362 of the plug 334 fit within the electrical sockets 426 of the socket 336 such that an electrical connection is made between the pin contacts 350 and the socket contacts 420. Additionally, the end faces of the ferrules 372 of the plug 334 are spring biased against the end faces of the ferrules 372 of the socket 336. The ferrules 372 of the socket 336 fit within the second sleeves 352 such that the second sleeves 352 function to co-axially align the ferrules 372 of the plug 334 and the socket 336. In this way, the optical fibers held within the ferrules 372 of the plug 334 and the socket 336 are coaxially aligned such that optical signals can be readily transferred between the optical terminals 354 of the plug 334 and the optical terminals 354 of the socket 336.

Figure 27:
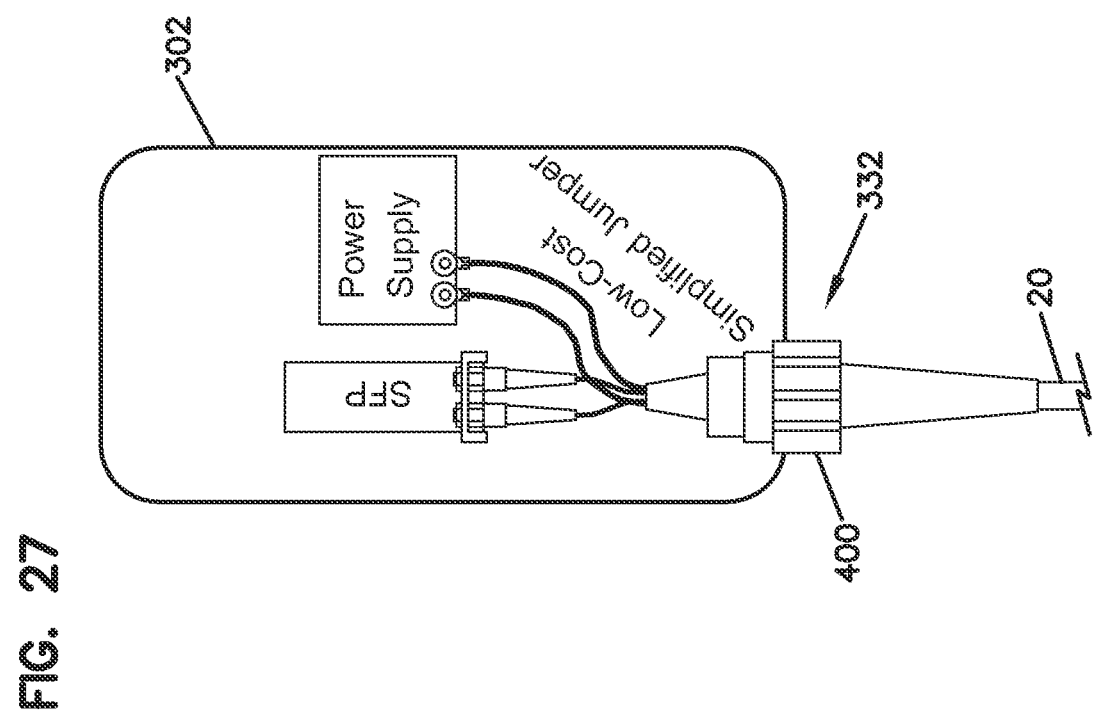
FIG. 27 illustrates an example of a jumper configuration for connecting a hybrid connector to an SFP and power supply of a remote radio head.
Figure 28:
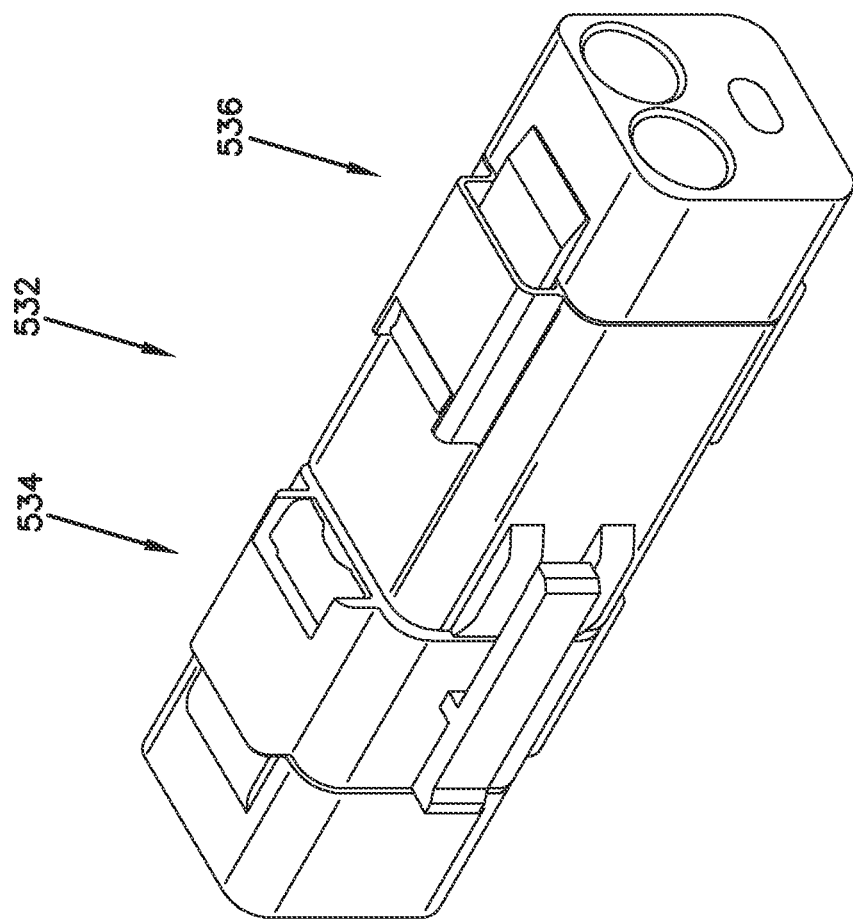
FIG. 28 illustrates another connector arrangement in accordance with the principles of the present disclosure.
Figure 29:
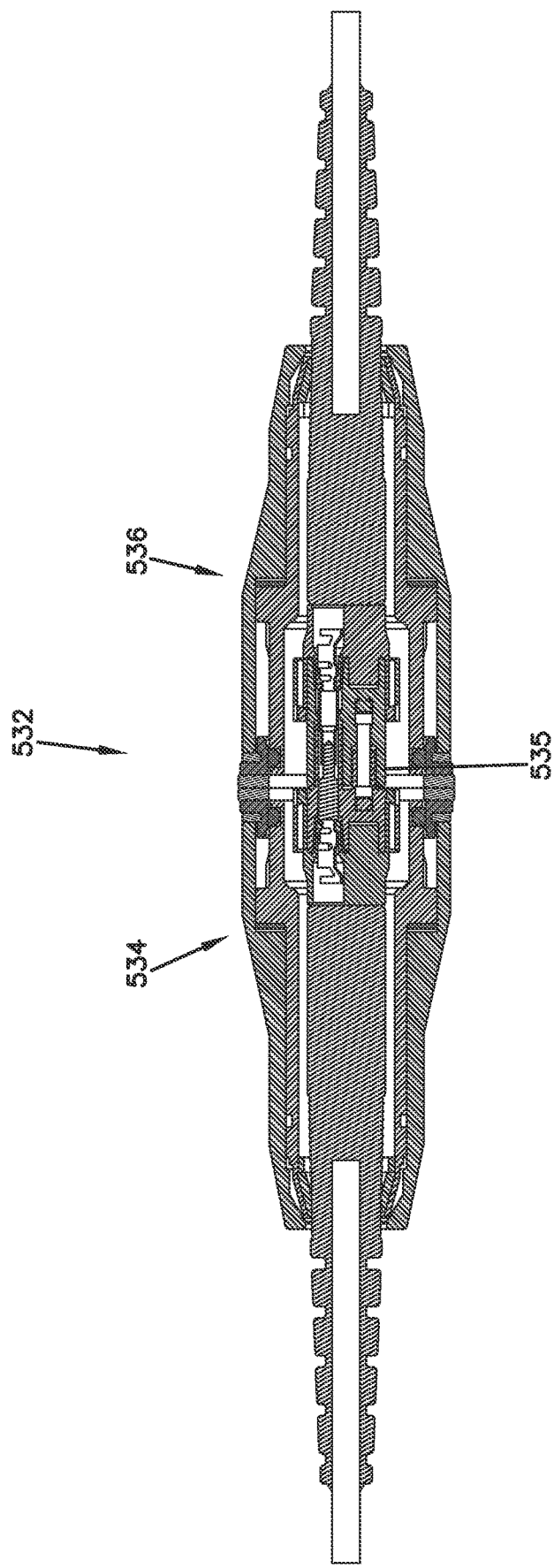
FIG. 29 is a cross-sectional view of the connector arrangement of FIG. 28.
Figure 31:
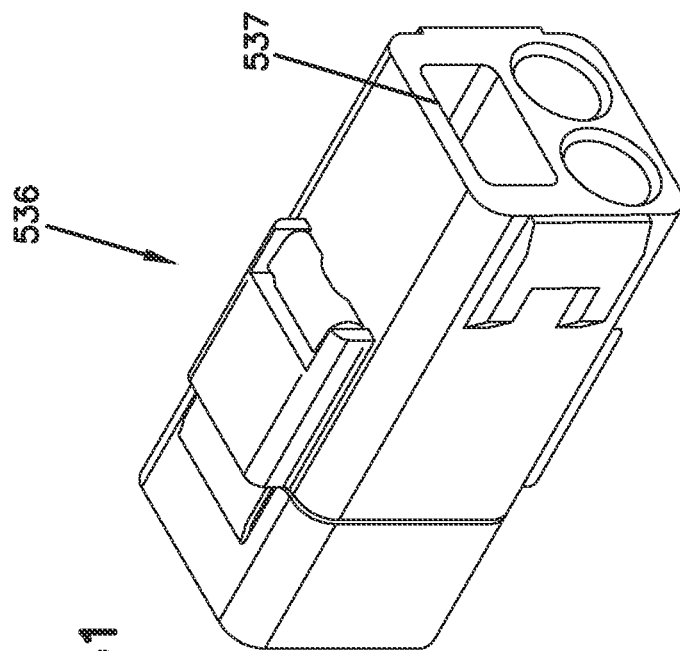
FIG. 31 illustrates an example hybrid socket of the connector arrangement of FIG. 28.

In certain examples, the fixture 338 can be incorporated into a plate or incorporated into a housing (e.g., the housing of a remote radio head) or otherwise attached to a housing. In certain examples, the sealing enclosure 400 may only be provided on one side of the hardened optical and power connector system 332 and the other side of an optical power and connection system 332 can be positioned within a housing such as the housing of a remote radio head. FIG. 27 shows an example of this type of configuration where one side of the hardened optical and power connection system 332 is enclosed within the protective enclosure 400 while the opposite side is positioned inside the housing of a remote radio head. In this depicted example, a harness or jumper can be coupled to the plug connector and/or socket connector positioned within the housing of the telecommunications component. The jumper can include an interface end that interfaces optically and electrically with the plug or socket and jumper ends that interface with the power supply and the small for-factor pluggable transceiver (SFP) of the remote radio head.

In certain examples, the optical terminal includes a self-contained optical connection unit that can be incorporated into connectors of various styles and shapes to convert the connectors to optical connectors. In certain examples, an optical terminal includes an insert housing adapted to be inserted within a receptacle of a corresponding connector. The insert housing at least partially houses a ferrule assembly including a ferrule and a hub. In certain examples, the hub is captured within the insert housing and the ferrule exits outwardly from one end of the insert housing. In certain examples, a spring can be loaded within the insert housing and used to press the ferrule assembly against a shoulder or other retention structure provided within the insert housing. In certain examples, the optical terminal is a module or unit that provides spring biasing of a ferrule assembly. In certain examples, a separate structure is not needed within the connector to provide spring biasing of the ferrule assembly. Instead, the insert housing, the spring and the ferrule assembly can all be loaded as a unit into the fiber optic connector. In certain examples, the ferrule of the ferrule assembly supports an optical fiber that is potted or otherwise bonded within a central fiber passage of the ferrule. In certain examples, optical fiber can have a stub end that extends at least partially through the insert housing. In certain examples, the stub can be optically spliced to an optical fiber of a corresponding cable. In certain examples, the optical splice location can be provided within the insert housing. In certain examples, the insert housing can include grooves, slots, notches, or other structures that facilitate anchoring or otherwise retaining the insert sleeve within a connector body. In certain examples, the spring is pre-biased prior to loading the ferrule assembly and the spring into a corresponding connector. In certain examples, the insert body can have a configuration that allows the optical terminal to be used in many different types of connectors. In certain examples, the optical terminal is a separate module that can be pre-assembled and then loaded into a fiber optic connector.

Certain aspects of the present disclosure also relate to an optical terminal having a spring loaded ferrule assembly that is preassembled prior to installation within a connector and that is loaded into the connector as a unit. In certain examples, the spring biased ferrule assembly includes a ferrule supported by a hub. The hub can be mounted within an insert body. As depicted in the drawings disclosed herein, the insert body has a generally cylindrical shape. In other examples, other types of shapes having different transverse cross-sectional profiles (e.g., rectangular, square, oblong, etc.) can be used. The insert body can function as a housing for the ferrule hub as well as a spring. A spring stop can be incorporated into the insert body, loaded into the insert body, attached with the insert body or otherwise coupled to the insert body for capturing the spring and the ferrule hub within the insert body. In certain examples, the optical terminal can be terminated to the optical fiber of a fiber optic cable prior to loading the optical terminal into a connector. For example, the optical terminal can be directly terminated on the optical fiber of a fiber optic cable by securing the optical fiber within the ferrule, polishing and otherwise treating the end face of the ferrule and the optical fiber secured therein, loading the ferrule and the ferrule hub into the insert body, loading the spring into the insert body, and then installing a spring retainer. In certain examples, the spring can be inserted over the fiber before terminating the fiber to the ferrule. In other examples, an optical fiber can be pre-installed within the ferrule and pre-polished with a stub extending outwardly from the back end of the ferrule. In such an example, the stub can be spliced to the optical fiber of a fiber optic cable and then the ferrule assembly can be loaded into the insert body of the optical terminal. Once again, the spring can be placed over the fiber of the cable prior to splicing. Therefore, after inserting the terminated ferrule assembly into the insert body, the spring can be subsequently loaded into the insert body and then retained in place with a spring retainer. In other examples, the optical terminal may be terminated to the optical fiber of a fiber optic cable after the optical terminal has been loaded into a connector. In certain examples, an optical terminal having a ferrule, a biasing spring and an insert at least partially containing the spring are pre-assembled and loaded into a connector as a unit.

Figure 30:
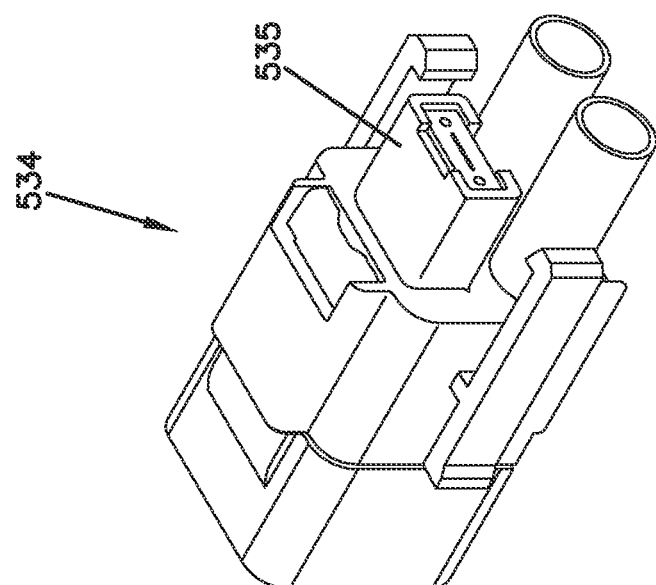
FIG. 30 illustrates an example hybrid plug of the connector arrangement of FIG. 28.

FIGS. 28-31 show another optical and power connection system 532 in accordance with the principles of the present disclosure. Similar to the previously described connection system 332, the connection system 532 includes a plug 534 that mates with a socket 536. The connection system 532 can include the same type of electrical interface previously described with respect to the system 332. However, the connector system 532 has been modified to include a different style of optical interface that utilizes multi fiber ferrules rather than single fiber ferrules. For example, as shown at FIG. 30, the plug 534 includes a generally rectangular sleeve 535 that houses a rectangular multi-fiber ferrule that supports a plurality of optical fibers aligned along at least one row. The socket 536 defines a rectangular receptacle 537 that receives the rectangular sleeve of the plug 534 when the plug 534 and the socket 536 are mated together. A corresponding multi-fiber ferrule can be mounted within the receptacle. When the socket 536 and the plug 534 are mated together, end faces of the multi-fiber ferrules oppose and abut one another with their corresponding optical fibers placed in co-axial alignment with one another such that optical transmissions can be made between the optical fibers of the aligned multi-fiber ferrules.

Another aspect of the present disclosure relates to a hybrid connection system including mating plugs and sockets having a mating geometry that provides optical and electrical connections without requiring an intermediate fiber optic adapter for providing optical fiber alignment. Thus, the hardened power and optical connection system has integrated fiber alignment provided through a mating relationship between the plug and the socket.

Various modifications and alterations of this disclosure may become apparent to those skilled in the art without departing from the scope and spirit of this disclosure, and it should be understood that the scope of this disclosure is not to be unduly limited to the illustrative examples set forth herein.

What is claimed is:

1. A hybrid electrical and fiber optic assembly comprising:
   a hybrid cable including first and second electrical conductors and an optical fiber;
   an optical and electrical connection device including:
      a first plastic connector body including a front end and a rear end, wherein the first and second electrical conductors and the optical fiber enter the first plastic connector body through the rear end of the first plastic connector body;
      a second plastic connector body that mounts at least partially within the first plastic connector body, the second plastic connector body establishing a first location for providing an electrical power connection with a mating optical and electrical connection component and a second location for providing a fiber optic connection with the mating optical and electrical connection component;
      first and second contact pins that are respectively electrically connected to the first and second electrical conductors of the hybrid cable, the first and second contact pins being positioned at the first location of the second plastic connector body;
      a ferrule and a ferrule spring positioned at the second location, the ferrule supporting an end portion of the optical fiber;
      the first and second plastic connector bodies being configured such that the second plastic connector body is adapted to be loaded into the first plastic connector body through the front end of the first plastic connector body after the first and second contact pins, the ferrule and the ferrule spring have been assembled at their corresponding first and second locations with respect to the second plastic connector body; and
      a turn-to-engage coupling sleeve for coupling the optical and electrical connection device to the mating optical and electrical connection component, the turn-to-engage coupling sleeve being configured to be turned relative to the first and second plastic connector bodies and being assembled over the first and second plastic connector bodies by moving the turn-to-engage coupling sleeve in a rear-to-forward direction relative to the first and second plastic connector bodies.

2. The hybrid electrical and fiber optic assembly of claim 1, wherein the optical and electrical connection device is a plug and wherein the mating optical and electrical component defines a socket for receiving the plug.

3. The hybrid electrical and fiber optic assembly of claim 1, wherein the second plastic connector body is secured within the first plastic connector body by a snap-fit connection.

4. The hybrid electrical and fiber optic assembly of claim 1, wherein the turn-to-engage coupling sleeve includes a bayonet connection structure for coupling with the mating optical and electrical connection component.

5. The hybrid electrical and fiber optic assembly of claim 1, wherein a strain relief boot mounts at the rear end of the first plastic connector body.

6. The hybrid electrical and fiber optic assembly of claim 1, wherein the second plastic connector body includes a forwardly facing surface, wherein sleeving for housing the first and second contact pins projects forwardly from the forwardly facing surface, and wherein the sleeving is part of the second plastic connector body.

7. The hybrid electrical and fiber optic assembly of claim 6, wherein forward ends of the first and second contact pins are recessed inside the sleeving.

8. The hybrid electrical and fiber optic assembly of claim 6, wherein the sleeving includes first and second portions of sleeving that at least partially surround the first and second contact pins, respectively.

9. The hybrid electrical fiber optic assembly of claim 8, wherein the first and second portions of sleeving are defined by first and second separate sleeves having rear ends that are part of the forwardly facing surface.

10. The hybrid electrical fiber optic assembly of claim 6, wherein the ferrule and the spring are housed at least partially in a fiber optic connector housing, and wherein an open space is defined between the fiber optic connector housing and the sleeving, the open space extending rearwardly along the sleeving to the forwardly facing surface of the second plastic connector body.

11. The hybrid electrical and fiber optic assembly of claim 10, wherein the fiber optic connector housing is defined by a sleeve as part of the second plastic connector body.

12. The hybrid electrical and fiber optic assembly of claim 6, wherein the optical fiber is one of a plurality of optical fibers included with the hybrid cable, wherein the ferrule is a multi-fiber ferrule that supports end portions of the plurality of optical fibers in at least one row, wherein the ferrule is housed at least partially in a fiber optic connector housing, and wherein an open space is defined between the fiber optic connector housing and the sleeving, the open space extending rearwardly along the sleeving to the forwardly facing surface of the second plastic connector body.

13. The hybrid electrical and fiber optic assembly of claim 6, wherein the optical fiber is one of first and second optical fibers included with the hybrid cable, wherein the ferrule is one of first and second ferrules that support end portions of respective ones of the first and second optical fibers, wherein the ferrule spring is one of first and second ferrule springs that respectively bias the first and second ferrules in a forward direction, wherein the first and second ferrules are respectively housed at least partially in first and second fiber optic connector housings, and wherein an open space is defined between the first and second fiber optic connector housings and the sleeving, the open space extending rearwardly along the sleeving to the forwardly facing surface of the second plastic connector body.

14. The hybrid electrical and fiber optic assembly of claim 1, wherein the second plastic connector body includes a forwardly facing surface, wherein first and second sleeves for respectively housing the first and second contact pins project forwardly from the forwardly facing surface, wherein rear ends of the first and second sleeves are part of the forwardly facing surface and an open space is provided between the first and second sleeves that extends rearwardly along the sleeves to the forwardly facing surface, wherein the optical fiber is one of first and second optical fibers included with the hybrid cable, wherein the ferrule is one of first and second ferrules that support end portions of respective ones of the first and second optical fibers, wherein the ferrule spring is one of first and second ferrule springs that respectively bias the first and second ferrules in a forward direction, and wherein the first and second ferrules are respectively housed at least partially in first and second forwardly extending fiber optic connector housings.

15. A hybrid electrical and fiber optic assembly comprising:
  a hybrid cable including first and second electrical conductors and an optical fiber;
  an optical and electrical connection device including:
    a first plastic connector body including a front end and a rear end, wherein the first and second electrical conductors and the optical fiber enter the first plastic connector body through the rear end of the first plastic connector body;
    a second plastic connector body that mounts at least partially within the first plastic connector body, the second plastic connector body including a forwardly facing surface and sleeving that projects forwardly from the forwardly facing surface, the sleeving being part of the second plastic connector body;
    first and second contact pins that are respectively electrically connected to the first and second electrical conductors of the hybrid cable, the first and second contact pins being housed within the sleeving;
    a ferrule positioned at least partially within a fiber optic connector housing coupled to the second plastic connector body, the ferrule supporting an end portion of the optical fiber;
    the first and second plastic connector bodies being configured such that the second plastic connector body is adapted to be loaded into the first plastic connector body through the front end of the first plastic connector body, wherein when the second plastic connector body has been mounted within the first plastic connector body, at least portions of the sleeving and the fiber optic connector housing are positioned forwardly with respect to the front end of the first plastic connector body, wherein an open space is defined between the sleeving and the fiber optic connector housing, and wherein the open space has a depth that extends rearwardly along the sleeving to the forwardly facing surface of the second plastic connector body; and
    a turn-to-engage coupling sleeve for coupling the optical and electrical connection device to a mating optical and electrical connection component.

16. The hybrid electrical and fiber optic assembly of claim 15, wherein the fiber optic connector housing is coupled to the second plastic connector body.

17. The hybrid electrical and fiber optic assembly of claim 15, wherein the optical fiber is one of a plurality of optical fibers included with the hybrid cable, and wherein the ferrule is a multi-fiber ferrule that supports end portions of the plurality of optical fibers in at least one row.

18. The hybrid electrical and fiber optic assembly of claim 15, wherein the optical fiber is one of first and second optical fibers included with the hybrid cable, wherein the ferrule is one of first and second ferrules that support end portions of respective ones of the first and second optical fibers, and wherein the fiber optic connector housing is one of first and second fiber optic connector housings in which the first and second ferrules are respectively at least partially housed.

19. The hybrid electrical and fiber optic assembly of claim 15, wherein the optical and electrical connection device is a plug and wherein the mating optical and electrical component defines a socket for receiving the plug.

20. The hybrid electrical and fiber optic assembly of claim 15, wherein the second plastic connector body is secured within the first plastic connector body by a snap-fit connection.

21. The hybrid electrical and fiber optic assembly of claim 15, wherein the turn-to-engage coupling sleeve includes a bayonet connection structure for coupling with the mating optical and electrical connection component.

22. The hybrid electrical and fiber optic assembly of claim 15, wherein a strain relief boot mounts at the rear end of the first plastic connector body.

23. A hybrid electrical and fiber optic assembly comprising:
a hybrid cable including first and second electrical conductors and a plurality of optical fibers;
an optical and electrical connection device including:
a first plastic connector body including a front end and a rear end, wherein the first and second electrical conductors and the optical fibers enter the first plastic connector body through the rear end of the first plastic connector body;
a second plastic connector body that mounts at least partially within the first plastic connector body, the second plastic connector body including a forwardly facing surface and sleeving that projects forwardly from the forwardly facing surface, wherein the sleeving includes first and second sleeves that project forwardly from the forwardly facing surface, the first and second sleeves including rear ends that are part of the forwardly facing surface, the second plastic connector body being configured with an open space provided between the first and second sleeves, the open space having a depth that extends rearwardly along the sleeves to the forwardly facing surface;
first and second contact pins that are respectively electrically connected to the first and second electrical conductors of the hybrid cable, the first and second contact pins being housed within the first and second sleeves, respectively;
ferrules and ferrule springs positioned at least partially within fiber optic connector housings coupled to the second plastic connector body, the ferrules supporting end portions of the plurality of optical fibers and being forwardly biased relative to the fiber optic connector housings by the ferrule springs;
the first and second plastic connector bodies being configured such that the second plastic connector body is adapted to be loaded into the first plastic connector body through the front end of the first plastic connector body, wherein when the second plastic connector body has been mounted within the first plastic connector body, at least portions of the first and second sleeves and the fiber optic connector housings are positioned forwardly with respect to the front end of the first plastic connector body; and
a turn-to-engage coupling sleeve for coupling the optical and electrical connection device to a mating optical and electrical connection component.

24. The hybrid electrical and fiber optic assembly of claim 23, wherein the fiber optic connector housings are coupled to the second plastic connector body.

25. The hybrid electrical and fiber optic assembly of claim 23, wherein the optical and electrical connection device is a plug and wherein the mating optical and electrical component defines a socket for receiving the plug.

26. The hybrid electrical and fiber optic assembly of claim 23, wherein the second plastic connector body is secured within the first plastic connector body by a snap-fit connection.

27. The hybrid electrical and fiber optic assembly of claim 23, wherein the turn-to-engage coupling sleeve includes a bayonet connection structure for coupling with the mating optical and electrical connection component.

28. The hybrid electrical and fiber optic assembly of claim 23, wherein a strain relief boot mounts at the rear end of the first plastic connector body.

* * * * *